US012780020B2

(12) United States Patent
Mohajerani et al.

(10) Patent No.: US 12,780,020 B2
(45) Date of Patent: Nov. 3, 2026

(54) HIGH VOLTAGE BATTERY CAPACITOR BANK AND MID-BUS PRE-CHARGING USING A LOWER VOLTAGE BATTERY

(71) Applicant: Rivian IP Holdings, LLC, Irvine, CA (US)

(72) Inventors: Zahra Mohajerani, Los Angeles, CA (US); Vishnu Narayan Vipin, Torrance, CA (US); Mohammad Nanda Rahmana Marwali, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/072,817

(22) Filed: Mar. 6, 2025

(65) Prior Publication Data

US 2026/0264548 A1 Sep. 10, 2026

(51) Int. Cl.

| | |
|---|---|
| ***B60L 53/20*** | (2019.01) |
| ***H02J 7/02*** | (2016.01) |
| ***H02J 7/34*** | (2006.01) |
| ***H02J 7/82*** | (2026.01) |
| ***H02M 1/00*** | (2007.01) |
| ***H02M 1/14*** | (2006.01) |
| ***H02M 1/44*** | (2007.01) |
| ***H02M 3/335*** | (2006.01) |
| ***H02M 7/162*** | (2006.01) |

(52) U.S. Cl.

CPC ................ *B60L 53/20* (2019.02); *H02J 7/02* (2013.01); *H02J 7/342* (2020.01); *H02J 7/345* (2013.01); *H02J 7/82* (2026.01); *H02M 1/007* (2021.05); *H02M 1/14* (2013.01); *H02M 1/44* (2013.01); *H02M 3/33573* (2021.05); *H02M 3/33592* (2013.01); *H02M 7/162* (2013.01); *H02J 2207/20* (2020.01); *H02J 2207/50* (2020.01)

(58) Field of Classification Search

CPC .... H02J 7/02; H02J 7/342; H02J 7/345; H02J 7/82; H02J 2207/20; H02J 2207/50; B60L 53/20; H02M 1/007; H02M 1/14; H02M 1/44; H02M 3/33573; H02M 3/33592; H02M 7/162

USPC .................................................. 307/9.1, 10.1

See application file for complete search history.

(56) References Cited

U.S. PATENT DOCUMENTS

| | | | | |
|---|---|---|---|---|
| 2024/0017627 | A1 | 1/2024 | Wang et al. | |
| 2025/0070588 | A1* | 2/2025 | Jones ...................... | H02J 7/345 |
| 2025/0303917 | A1* | 10/2025 | Gudapati ................ | B60L 58/12 |

* cited by examiner

*Primary Examiner* — Hal Kaplan
(74) *Attorney, Agent, or Firm* — HG Law LLP

(57) ABSTRACT

Techniques for pre-charging buses of an electric vehicle include causing a first DC bus, while a high-voltage battery is decoupled from the first DC bus, to be pre-charged by a low-voltage battery using a first DC-DC converter coupled between the first DC bus and the low-voltage battery. The techniques also include causing a second DC bus to be pre-charged using a second DC-DC converter coupled between the first DC bus and the second DC bus, which may be performed after or during pre-charging the first DC bus. The techniques additionally may include causing an AC bus to be pre-charged using a DC-AC converter coupled to the second DC bus and to the AC bus, while a grid contactor is open.

20 Claims, 8 Drawing Sheets

HIGH VOLTAGE BATTERY CAPACITOR BANK AND MID-BUS PRE-CHARGING USING A LOWER VOLTAGE BATTERY

The present disclosure is directed to pre-charging buses using a lower voltage battery such as a 12 V battery.

SUMMARY

In some embodiments, the present disclosure is directed to a method of pre-charging using a lower voltage battery. In some embodiments, the method includes receiving an indication to pre-charge a high-voltage DC bus, transferring power (using a DC-DC converter) from a low-voltage DC bus to the high-voltage DC bus while a high-voltage battery is not coupled across the high-voltage DC bus to pre-charge a capacitor connected across the high-voltage DC bus, and causing a contactor, arranged between the high-voltage DC bus and the high-voltage battery, to close to connect the high-voltage battery across the high-voltage DC bus after pre-charging the capacitor. The low-voltage DC bus is connected to a low-voltage battery, for example. In some embodiments, the high-voltage battery includes a first nominal voltage greater than 100 V and is configured to provide electric power to a drivetrain, and the low-voltage battery includes a second nominal voltage less than 15.5 V and is configured to provide power to electric loads other than the drivetrain.

In some embodiments, the DC-DC converter is configured to transfer power based on a predetermined ramp rate of current draw from the low-voltage battery to pre-charge the capacitor up to a predetermined voltage, and the ramp rate of the current draw of the low-voltage battery causes the capacitor to be pre-charged up to the predetermined voltage. In some embodiments, the DC-DC converter includes a bridge circuit, and the DC-DC converter is configured to transfer power by increasing a duty cycle of the bridge circuit at a predetermined ramp rate from zero duty cycle up to half of a full duty cycle. In some embodiments, the DC-DC converter is configured to transfer power based on a control signal, and the control signal corresponds to a ramp rate of current draw from the low-voltage battery. In some embodiments, the DC-DC converter is configured to transfer power based on a control signal that causes a current draw of the low-voltage battery to increase up to a maximum current value, and the maximum current value corresponds to a predetermined drop in voltage of the DC low-voltage bus. In some embodiments, the method includes measuring a voltage across the low-voltage DC bus, determining that the voltage is below a predetermined threshold, and causing the DC-DC converter to modify the transfer of power to maintain the voltage across the low-voltage DC bus. In some embodiments, the method includes measuring a voltage across the high-voltage DC bus, determining that the voltage has reached a predetermined nominal voltage, and causing the DC-DC converter to maintain the voltage across the high-voltage DC bus at the predetermined nominal voltage.

In some embodiments, the capacitor is a first capacitor, the DC-DC converter is a first DC-DC converter, a second DC-DC converter is coupled between the high-voltage DC bus and an intermediate DC bus, the intermediate DC bus is coupled to a DC-AC converter, and the DC-AC converter is coupled to an AC bus and a grid contactor. In some such embodiments, the method includes, after closing the contactor, pre-charging a second capacitor coupled across the intermediate DC bus using the second DC-DC converter, and pre-charging a third capacitor coupled across the AC bus while the grid contactor is open using the DC-AC converter.

In some embodiments, the capacitor is a first capacitor, the DC-DC converter is a first DC-DC converter. In some embodiments, for example, the method includes determining that a state of charge (SOC) of the high-voltage battery is less than a predetermined SOC, and before closing the contactor, causing a second DC-DC converter to pre-charge a second capacitor coupled across an intermediate DC bus. For example, the second DC-DC converter is configured to transfer power between the high-voltage DC bus and the intermediate DC bus.

In some embodiments, the present disclosure is directed to a method including causing a first DC bus, while a high-voltage battery is decoupled from the first DC bus, to be pre-charged by a low-voltage battery using a first DC-DC converter coupled between the first DC bus and the low-voltage battery. In some embodiments, the method also includes causing a second DC bus to be pre-charged using a second DC-DC converter coupled between the first DC bus and the second DC bus. In some embodiments, the method also includes causing an AC bus to be pre-charged, while an AC contactor coupled between the AC bus and an AC system is open, using a DC-AC converter coupled to the second DC bus and to the AC bus. In some embodiments, a first contactor is configured to couple and decouple the high-voltage battery across the first DC bus, and the method includes closing the first contactor after causing the first DC bus, the second DC bus, and the AC bus to be pre-charged. In some embodiments, causing the first DC bus to be pre-charged and causing the second bus to be pre-charged occur simultaneously during a time period, and a first contactor arranged between the first DC bus and the high-voltage battery is open during the time period. In some embodiments, causing the first DC bus to be pre-charged includes applying feedback control, and causing the second DC bus to be pre-charged includes applying open loop control based on a predetermined control signal. In some embodiments, the method includes receiving a sensor signal from a voltage sensor coupled to the AC system, matching a first voltage of the AC bus to a second voltage of the AC system based on the sensor signal, and causing the AC contactor to be closed after matching the first voltage to the second voltage.

In some embodiments, the present disclosure is directed to a system including a high-voltage battery, a DC-DC converter connected between a low-voltage DC bus and a high-voltage DC bus, a low-voltage battery configured to be connected and disconnected from the low-voltage DC bus, a capacitor connected across the high-voltage DC bus, a contactor configured to connect and disconnect the high-voltage battery from the high-voltage DC bus, and control circuitry. In some embodiments, the control circuitry is configured to receive an indication to pre-charge the high-voltage DC bus, cause the DC-DC converter to transfer power from the low-voltage DC bus to the high-voltage DC bus while the high-voltage battery is disconnected from the high-voltage DC bus to pre-charge the capacitor in response to the indication, and close the contactor to connect the high-voltage battery across the high-voltage DC bus after the capacitor has been pre-charged. In some embodiments, the capacitor is a first capacitor, the DC-DC converter is a first DC-DC converter, and the control circuitry is configured to, after closing the contactor, cause a second DC-DC converter to pre-charge a second capacitor coupled to an intermediate DC bus. For example, the second DC-DC converter is configured to transfer power between the high-voltage DC bus and the intermediate DC bus. In some embodiments, the intermediate DC bus is coupled to an AC-DC converter that is coupled to an AC bus and a grid contactor, and the control circuitry is configured to cause the AC-DC converter to match a first voltage of the AC bus to a second voltage of a grid coupled to the grid contactor, and cause the grid contactor to be closed after matching the first voltage to the second voltage. In some embodiments, the capacitor is a first capacitor, the DC-DC converter is a first DC-DC converter, and the control circuitry is configured to determine that a state of charge of the high-voltage battery is less than a threshold and, before closing the contactor, cause a second DC-DC converter to pre-charge a second capacitor coupled to an intermediate DC bus. For example, the second DC-DC converter is configured to transfer power between the high-voltage DC bus and the intermediate DC bus. In some embodiments, the intermediate DC bus is coupled to a DC-AC converter coupled to an AC bus, a second contactor is configured to couple and decouple the AC bus from the grid, and the control circuitry is configured to cause the DC-AC converter to pre-charge the AC bus, and cause the second contactor to be closed.

BRIEF DESCRIPTION OF THE DRAWINGS

The present disclosure, in accordance with one or more various embodiments, is described in detail with reference to the following figures. The drawings are provided for purposes of illustration only and merely depict illustrative embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, the present disclosure is directed to systems and methods for using a low-voltage battery, such as a 12V battery, to pre-charge DC buses of an onboard charger (OBC) of a vehicle. The DC buses may include both a high-voltage bus coupled to a battery pack, and a mid-bus of the OBC. The low-voltage battery may generally be used for auxiliaries and non-drive loads, and may be coupled to a DC-DC converter to be charged during normal operation by the high-voltage bus. The high-voltage bus is coupled to a mid-bus using another DC-DC converter. The mid-bus in turn is coupled to the grid using a DC-AC converter. When coupled to a charger for power transfer, each bus of the OBC may be brought up to a nominal or operating voltage to avoid large voltage differences across contactors and other devices. According to some embodiments, the 12V battery may be used to pre-charge the buses of the OBC. In one illustrative approach, the high-voltage bus is charged first, the battery pack is connected (e.g., at a voltage greater than 12V) to the high-voltage bus, and then the mid-bus is charged. In another illustrative approach, both the high-voltage bus and mid-bus are charged simultaneously using the 12V battery, without coupling the battery pack (e.g., when the battery pack is at a critically low state of charge). For architectures without a bypass circuit, for example, a voltage sensor may be used to measure the AC voltage on the grid side, and the AC bus of the OBC may be synchronized with the grid before the grid contactor is closed. The techniques of the present disclosure may allow for cost savings by allowing components for resistance-based pre-charging and bypass relays to be omitted. The techniques of the present disclosure may also allow for starting the charging of the car as a system from a completely drained or dead high-voltage battery (e.g., that is not available to be used for pre-charge), for example.

Figure 1:
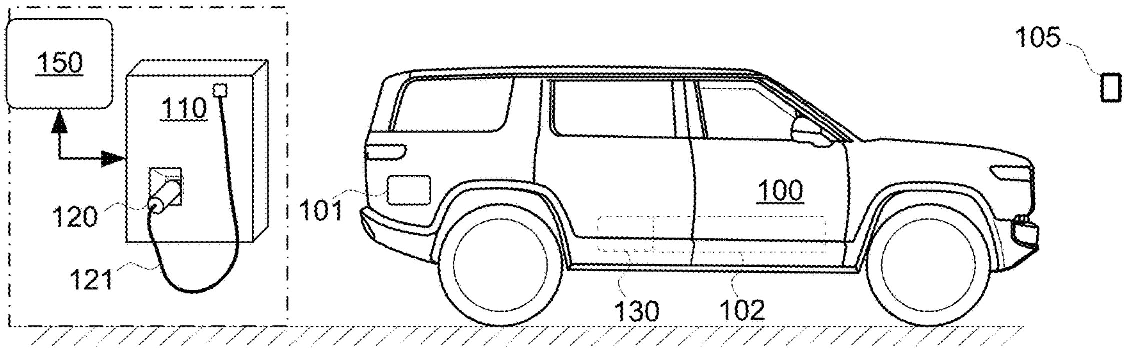
FIG. 1 is a block diagram of an illustrative charger and electric vehicle, in accordance with some embodiments of the present disclosure.
Figure 2:
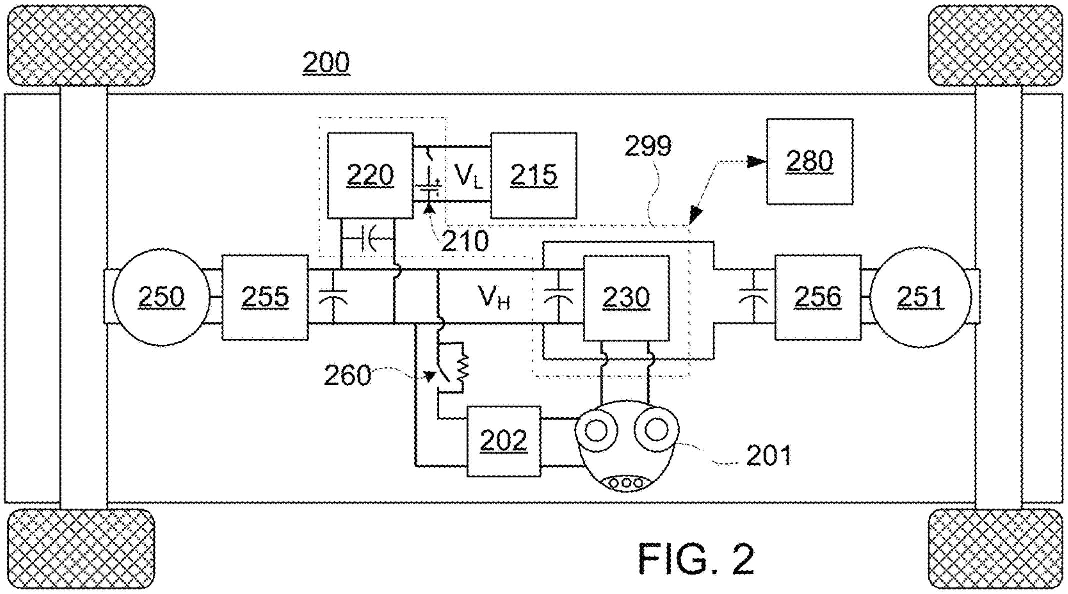
FIG. 2 is a block diagram of an illustrative electric vehicle having an onboard charger, in accordance with some embodiments of the present disclosure.
Figure 3:
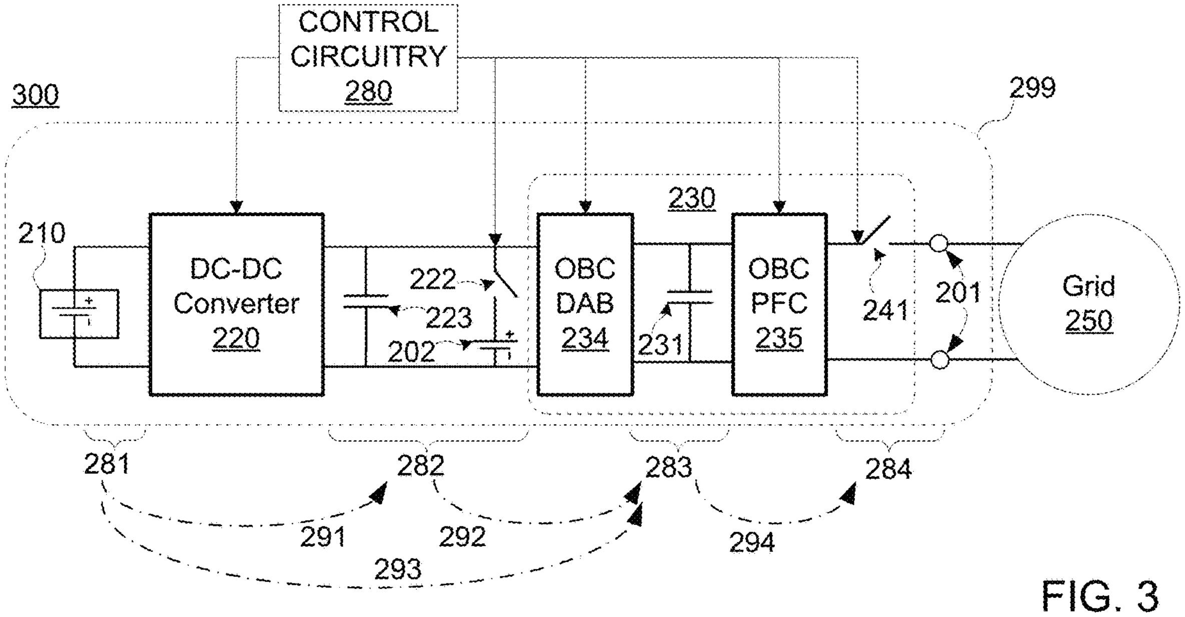
FIG. 3 is a block diagram of an illustrative charging system, in accordance with some embodiments of the present disclosure.

Referring to FIGS. 1-3, the following aspects are illustrated:

100: Vehicle;
101: Charging Port;
102: Battery;
105: Keyfob;
110: Charger;
120: Charging Coupler;
121: Cable;
130: Charging Controller;
150: AC System (e.g., Grid);
200: Electric Vehicle;
201: Charging Port;
202: Battery Pack;
210: Low-voltage Battery;
215: Electric Loads;
220: DC-DC Converter (between low-voltage DC bus and high-voltage DC bus);
222: High-voltage Contactor;
223: High-voltage Capacitor Bank;
230: OBC;
231: Mid-bus Capacitor Bank;
234: OBC DAB;
235: OBC PFC;
241: Grid Contactor;
250 & 251: Motors;
255 & 256: DC-AC converters;
260: Circuit (e.g., a bypass circuit);
280: Control Circuitry;
281: Low-voltage DC Bus;
282: High-voltage DC Bus;
283: Mid-bus;
284: AC Bus;
291: Operation (pre-charging high-voltage DC bus using low-voltage DC bus);

292: Operation (pre-charging mid-bus using high-voltage DC bus);

293: Operation (pre-charging high-voltage DC bus and mid-bus using low-voltage DC bus);

294: Operation (pre-charging AC bus from mid-bus to match grid); and

299: Boundary.

FIG. 1 is a block diagram of illustrative charger 110 and vehicle 100, in accordance with some embodiments of the present disclosure. As illustrated, vehicle 100, which may be an electric vehicle, includes battery 102 (e.g., a battery pack) and charging controller 130, operating at any suitable voltage and power capacity. Charger 110 is configured to increase the state of charge (SOC) of battery 102 (and decrease the SOC when the charger 110 is a bidirectional charger and vehicle 100 is being used to power, for example, a home). For example, vehicle 100 may be positioned near charger 110 (e.g., mounted to a wall or structure in a garage, parking stall, or other suitable facility), and charging coupler 120 may be de-docked from charger 110 and coupled to port 101 of vehicle 100. Cable 121 is a charging cable that extends to charging coupler 120. In some embodiments, charger 110 may be coupled to an electric grid (e.g., AC system 150). For example, charger 110 may be coupled to one or more circuits of a circuit breaker or main panel in a residence. Charger 110 may provide or receive AC power, DC power, control signals, or a combination thereof to vehicle 100 (e.g., an onboard charger thereof). Charging controller 130 may include an onboard charger (OBC), configured to manage power transfer to and from vehicle 100 (e.g., battery 102 thereof). Charging controller 130 may include one or more AC-DC converters, DC-DC converters, capacitor banks, DC buses, AC buses, one or more contactors or relays, voltage sensors, current sensors, any other suitable circuitry, or any combination thereof. In some embodiments, keyfob 105 is associated with vehicle 100 and under normal operation, may allow the user to unlock doors and hatches, lock doors and hatches, unlock or lock some doors and hatches, start the vehicle, signal a panic condition, perform any other suitable function, or any combination thereof. Keyfob 105 may include, for example, a plurality of buttons or other features for receiving haptic input from a user, a battery to provide electrical power, an antenna for transmitting and receiving signals, and control circuitry for converting user selections (e.g., presses of a button) to an electrical signal (e.g., via control circuitry) and then a wireless signal (e.g., via the antenna). Although not illustrated in FIG. 1, a user may use a smartphone instead of or in addition to keyfob 105 to transmit information to vehicle 100. In some embodiments, vehicle 100 receives messages or otherwise signals from keyfob 105 (e.g., RF signals, NFC signals, any other suitable types of signals), and maps the input to one or more commands or determines that keyfob 105 is proximal. For example, vehicle 100 (e.g., control circuitry thereof) may be configured to determine a presence of keyfob 105, which may provide an indication that pre-charging may begin (e.g., an authorization process may occur based on the presence and identification of keyfob 105).

FIG. 2 is a block diagram of illustrative electric vehicle 200 having onboard charger 230 (OBC 230), in accordance with some embodiments of the present disclosure. For example, electric vehicle 200 may be similar or the same as vehicle 100 of FIG. 1, and onboard charger 230 may be similar to, the same as, or included in, charging controller 130 of FIG. 1. As illustrated, electric vehicle 200 includes charging port 201 (e.g., a NACS coupler), battery pack 202, motors 250 and 251, DC-AC converters 255 and 256, DC-DC converter 220, electric loads 215, circuit 260, DC buses (e.g., at voltages $V_L$ and $V_H$), control circuitry 280, any other suitable components, or any combination thereof. In some embodiments, for example, DC-AC converter 255 and motor 250 may drive a first set of wheels of the drivetrain, and DC-AC converter 256 and motor 251 may drive a second set of wheels of the drivetrain. In some embodiments, not illustrated in FIG. 2, a vehicle may include one motor (e.g., to drive all wheels or a single drive axis), or more than two motors (e.g., one motor for each wheel), and may include respective DC-AC converters for each motor. Charging port 201 may include any suitable design to accommodate any suitable charging coupler. For example, charging port 201 may be configured for DC charging, AC charging, or both, and may include one or more communication ports. For example, as illustrated, charging port 201 may be electrically coupled to battery pack 202 (e.g., for direct DC charging), and electrically coupled to OBC 230 (e.g., for AC charging from the grid or providing AC power to an AC system or grid). As illustrated, circuit 260 may be included for direct DC charging, and may include a contactor (e.g., to open or close) arranged in parallel with a resistor (e.g., to limit current flow when the contactor is open). In some embodiments, $V_L$ is nominally 12V, and may correspond to low-voltage battery 210 having a voltage of less than 15V, between 10-15V or any other suitable range depending on a SOC. Low-voltage battery 210 (e.g., relative to the voltage of battery pack 202) may be used to provide power to electric loads 215, which may include motors (e.g., of pumps, compressors, or fans), actuators (e.g., for latching or locking), circuits, displays, any other suitable components, or any combination thereof. Accordingly, DC-DC converter 220 converts between DC buses at $V_L$ and $V_H$. For example, the high-voltage bus, nominally at $V_H$, is coupled to battery pack 202 and is used to drive motors 250 and 251 via DC-AC converters 255 and 256. In some embodiments, OBC 230 includes a power factor correction circuit (PFC) and a dual-active bridge (DAB), for example. The present disclosure is applicable to systems having any suitable type of DC-DC converter and DC-AC converter.

FIG. 3 is a block diagram of illustrative charging system (e.g., corresponding in part to boundary 299 of FIG. 2), in accordance with some embodiments of the present disclosure. As illustrated, system 300 includes low-voltage battery 210 (e.g., a 12V battery), low-voltage DC bus 281, DC-DC converter 220, high-voltage DC bus 282 (e.g., a DC bus), OBC DAB 234, mid-bus 283 (e.g., another DC bus) with mid-bus capacitor bank 231, OBC PFC 235, AC bus 284, control circuitry 280, grid contactor 241, and grid 250. As illustrated, high-voltage capacitor bank 223, high-voltage contactor 222, and battery pack 202 are coupled to high-voltage DC bus 282. To illustrate, system 300, except for grid 250, may be included as part of an electric vehicle. When the electric vehicle is operating, grid 250 is not coupled, and battery pack 202 provides power to the drivetrain of the vehicle, and low-voltage battery 210 provides power to other electric loads of the vehicle. When the electric vehicle is ready for charging or discharging to charge another system (e.g., the system is configured for bidirectional charging), the various buses and circuitry of system 300 may be pre-charged to lessen in-rush currents or arcing. In some embodiments, the present disclosure is directed to systems and methods for pre-charging. Illustrative pre-charging operations 291-294 are illustrated in FIG. 3. Regarding operations 291-294 of FIG. 3, once high-voltage DC bus 282, mid-bus 283, and AC bus 284 are pre-charged, grid contactor 241 may then be closed and power transfer may begin. As an example, OBC DAB 234 may be included because the voltage across mid-bus 283 may be limited to the rectified voltage of AC bus 284, but the nominal voltage across high-voltage DC bus 282 (e.g., nominal voltage of battery pack 202) may need to be greater than the mid-bus voltage. Accordingly, OBC DAB 234 may include a transformer having a suitable turns ratio to allow high-voltage DC bus 282 to achieve a nominal voltage greater than a rectified voltage of AC bus 284 that may be achieved by mid-bus 283. Also, regarding AC bus 284, OBC PFC 235 is configured to apply power factor correction (e.g., to improve efficiency in converting AC power) and DC-AC conversion between AC bus 284 to mid-bus 283.

Operation 291 corresponds to charging high-voltage DC bus 282 using low-voltage battery 210 via low-voltage DC bus 281 and DC-DC converter 220. While operation 291 proceeds (e.g., the voltage of high-voltage DC bus 282 is increased), high-voltage contactor 222 is in an open contactor, such that battery pack 202 is not coupled across the DC lines of high-voltage DC bus 282. To illustrate, in some embodiments, operation 291 adheres to (e.g., is limited by) any suitable current limits of low-voltage battery 210. As high-voltage capacitor bank 223 is pre-charged (e.g., as high-voltage contactor 222 is open), the voltage across high-voltage DC bus 282 also rises. In an illustrative example, in some embodiments, the time to pre-charge high-voltage DC bus 282 to 450V may be about 0.5 seconds for a peak power of 1 kW of low-voltage battery 210. Once pre-charged, high-voltage contactor 222 is closed to connect battery pack 202 to the rest of the system (e.g., via high-voltage DC bus 282). Operation 291 may be managed by a controller, which may be configured to generate and transmit control signals to DC-DC converter 220 (e.g., to suitable power transistors arranged in a bridge circuit).

Operation 292 corresponds to pre-charging mid-bus 283 using battery pack 202 via high-voltage DC bus 282 and OBC DAB 234. Accordingly, high-voltage contactor 222 may be closed after operation 291 is completed and before operation 292 begins. In some embodiments, operation 292 proceeds until mid-bus 283 achieves a desired mid-bus voltage. For example, operation 292 proceeds until the mid-bus voltage exceeds a predetermined voltage threshold, or any other suitable criteria. To illustrate, one pre-charging approach may be to perform operations 291 and 292 sequentially to pre-charge both high-voltage DC bus 282 and then mid-bus 283. To illustrate, in some embodiments, mid-bus 283 is pre-charged using OBC DAB 234 when battery pack 202 is at a normal SOC (e.g., not a critically low SOC), and high-voltage contactor 222 is closed. To illustrate further, in some embodiments, operation 291 adheres to (e.g., is limited by) any suitable current limits of battery pack 202. In an illustrative example, in some embodiments, the time to pre-charge mid-bus 283 to 450V may be about 0.35 seconds at a peak power of 1.5 kW from battery pack 202. In a further example, operation 292 may be needed only for start-of charge (e.g., grid connected) functionality and inverting (e.g., to grid or AC loads) functionality. Operation 292 may be managed by a controller, which may be configured to generate and transmit control signals to OBC DAB 234 (e.g., to suitable power transistors arranged in a bridge circuit).

In some embodiments, operation 294 may be performed to pre-charge AC bus 284 prior to closing grid contactor 241. It will be understood that, while the voltage of an AC bus may fluctuate in time (e.g., as a sinusoid), pre-charging an AC bus may refer to controlling the voltage of the AC bus in time to achieve a desired voltage. For example, for DC buses, pre-charging may include achieving at least a nominal or target voltage while for AC buses, pre-charging may include achieving an amplitude, frequency, and phase of voltage across the AC bus. In some embodiments, AC bus 284 may include a bypass circuit having a contactor in parallel with a resistor to limit current before the contactor is closed, and operation 294 may include allowing the AC bus (e.g., and an AC capacitor bank coupled across AC bus 284) to pre-charge through the bypass resistor (e.g., synchronize sinusoidal voltages) to match grid 250, and then closing grid contactor 241 to less the resistance in AC bus 284. In some embodiments, without a bypass circuit or with an AC capacitor bank that cannot be hot plugged across live AC voltages, OBC PFC 235 may include a voltage sensor configured to measure the grid voltage (e.g., provided by grid 250). The voltage of AC bus 284 is controlled by OBC PFC 235 to match the grid voltage and, once matched, grid contactor 241 is closed. Operation 294 may be managed by a controller, which may be configured to generate and transmit control signals to OBC PFC 235 (e.g., to suitable power transistors arranged in a bridge circuit).

In some circumstances, such as a low SOC of battery pack 202, system 300 may achieve pre-charging using low-voltage battery 210 via low-voltage DC bus 281, without using battery pack 202. In some embodiments, operation 293 allows both high-voltage DC bus 282 and mid-bus 283 to be pre-charged at the same time, without closing high-voltage contactor 222. For example, system 300 may perform operation 293 instead of operations 291 and 292. To illustrate, operation 293 includes pre-charging mid-bus 283 using DC-DC converter 220 and OBC DAB 234, with high-voltage contactor 222 in an open configuration. To illustrate further, in some embodiments, operation 293 adheres to (e.g., is limited by) any suitable current limits of low-voltage battery 210 (e.g., because the high-voltage battery is not connected or otherwise available for pre-charging). During operation 293, DC converter 220 and OBC DAB 234 work in cascade to pre-charge mid-bus 283 from low-voltage battery 210. In an illustrative example, in some embodiments, the time to pre-charge high-voltage DC bus 282 and mid-bus 283 simultaneously may be about 0.5 seconds at a peak power of 1.68 kW from low-voltage battery 210. In some embodiments, during operation 293, feedback control is used to control DC-DC converter 220 and open loop control (e.g., using predetermined duty cycles for transistors in a bridge arrangement) is used to control OBC DAB 234.

Figure 4A:
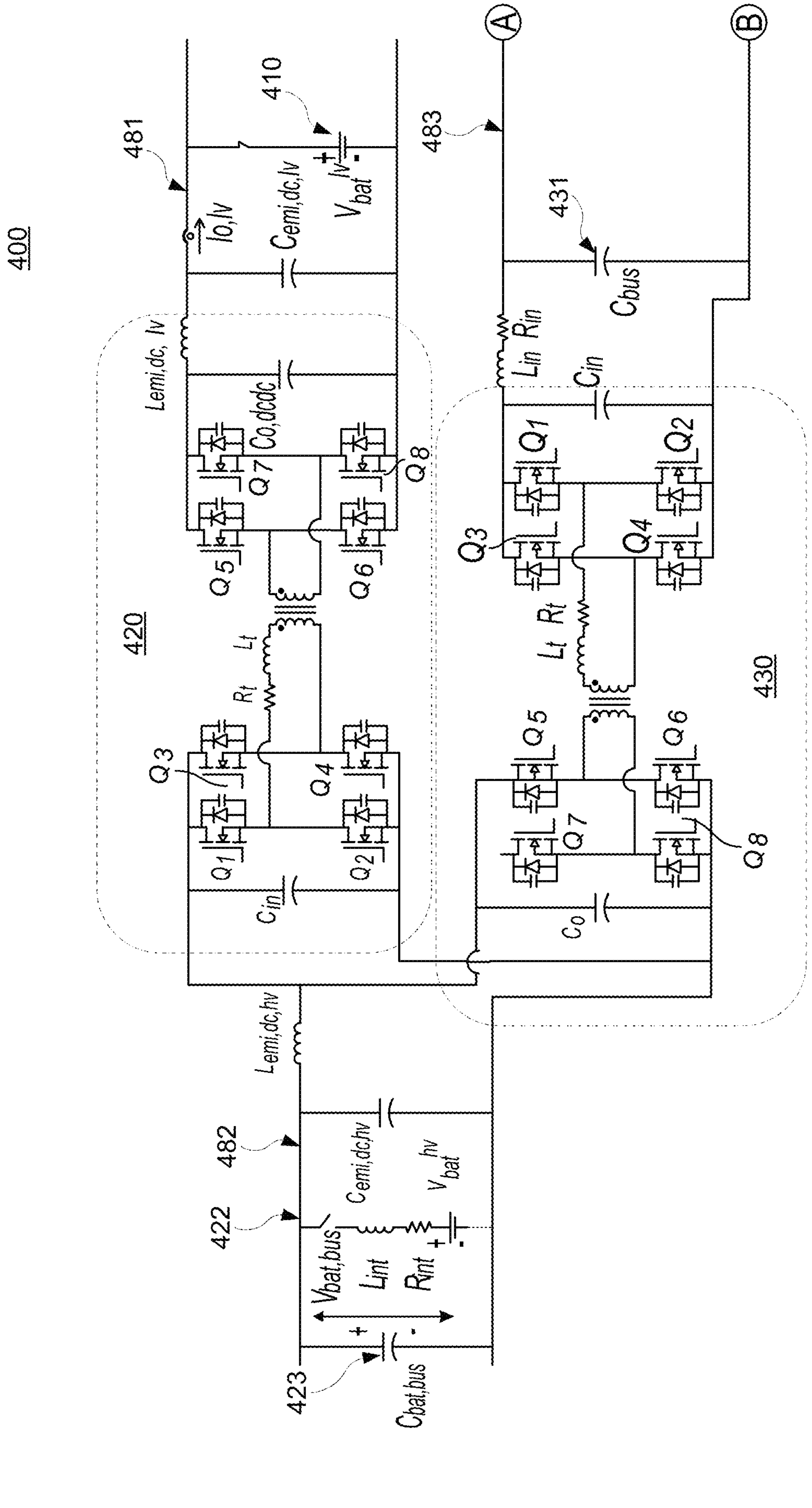
FIGS. 4A-4B are schematic diagrams of an illustrative system having DC buses, in accordance with some embodiments of the present disclosure.
Figure 4B:
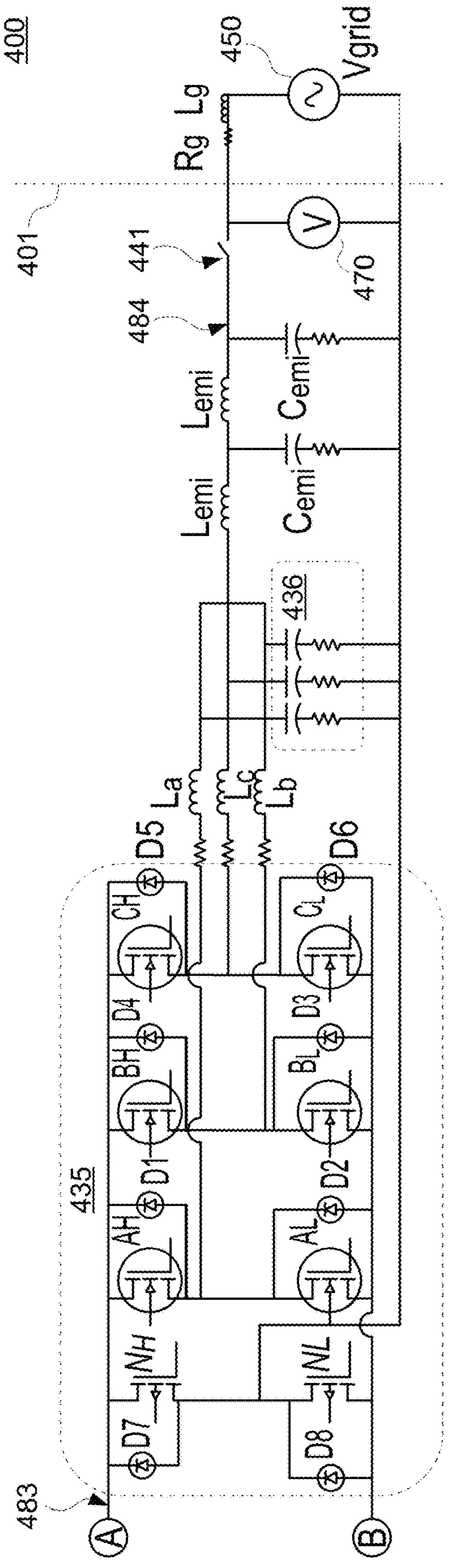

FIGS. 4A-4B are schematic diagrams of illustrative system 400 having DC buses, in accordance with some embodiments of the present disclosure. For example, system 400 may be similar to system 300 of FIG. 3, although illustrated with relatively more detail. Referring to FIGS. 4A-4B, the following aspects are illustrated:

400: System;
401: Charging Connection;
402: Battery Pack;
410: Low-voltage Battery;
420: DC-DC Converter;
422: High-voltage Contactor;
423: High-voltage Capacitor Bank;
430: OBC DAB;
431: Mid-bus Capacitor Bank;
435: DC-AC converter;
436: AC capacitor bank;
441: Grid Contactor;

450: Grid;
470: Sensor;
481: Low-voltage DC Bus;
482: High-voltage DC Bus;
483: Mid-bus; and
484: AC Bus.

As illustrated, system 400 includes low-voltage battery 410 coupled to low-voltage DC bus 481, DC-DC converter 420 electrically coupled between low-voltage DC bus 481 and high-voltage DC bus 482, high-voltage capacitor bank 423, battery pack 402, high-voltage contactor 422, DC-DC converter 430 electrically coupled between high-voltage DC bus 482 and mid-bus 483, mid-bus capacitor bank 431, DC-AC converter 435 (e.g., which may include field-effect transistors (FETs)) electrically coupled between mid-bus 483 (i.e., an intermediate DC bus) and AC bus 484, AC capacitor bank 436, grid contactor 441 coupled between AC bus 484 and grid 450 (e.g., grid contactor 441 may be coupled across one line, more than one line, or all lines of AC bus 484), and sensor 470 (e.g., a voltage sensor). In some embodiments, an OBC includes control circuitry (e.g., not illustrated in FIGS. 4A-4B, but may include control circuitry 280 of FIGS. 2-3) to determine, generate, and transmit control signals to the switches of DC-DC-converter 420, DC-DC converter 430, and DC-AC converter 435, and to suitable terminals of high-voltage contactor 422 and grid contactor 441. Although not illustrated in FIGS. 4A-4B, low-voltage loads may be electrically coupled to low-voltage DC bus 481, and high-voltage loads (e.g., a DC-AC converter for exchanging power with a drivetrain motor) may be electrically coupled to high-voltage DC bus 482. In some embodiments, if high-voltage bus 482 is configured to operate at a nominal voltage less than the rectified voltage of AC bus 484, mid-bus 483 and OBC DAB 430 may be omitted, and the pre-charging techniques of the present disclosure may still apply to the remaining system. It will be understood that the present disclosure may be applied to any suitable topology, DC-DC converter type, DC-AC converter type, contactor type, nominal operating voltage, or any combination thereof. As an illustrate example, in some embodiments, the present disclosure is directed to avoiding the need to use resistive pre-charging using the high-voltage battery, and instead using the low-voltage battery to pre-charge. This approach may allow for cost savings by eliminating a resistive pre-charge circuit (e.g., coupled across high-voltage DC bus 482) and bypass circuits.

Figure 5:
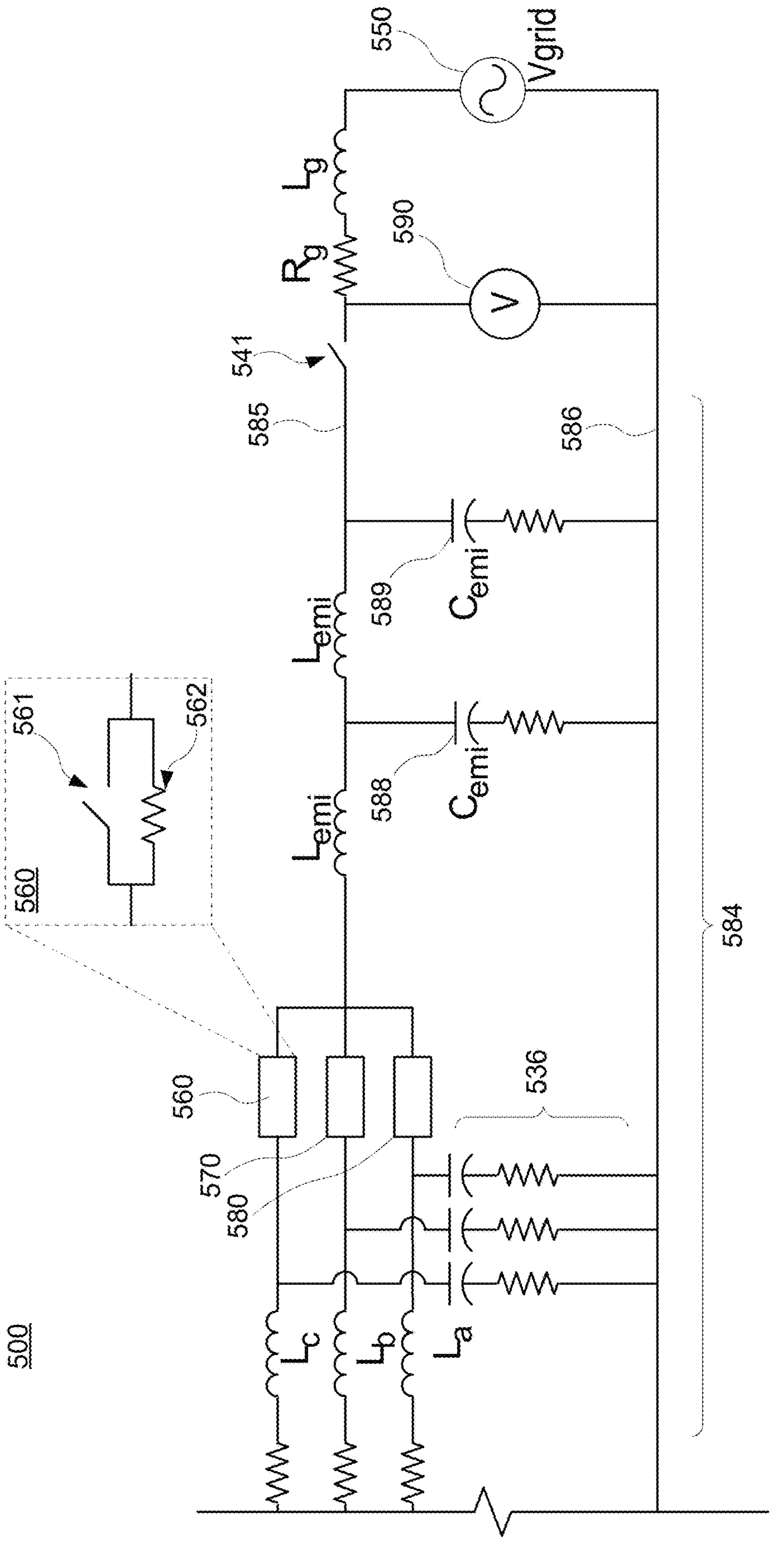
FIG. 5 is a block diagram of a portion of an illustrative system having bypass circuits installed in the AC bus, in accordance with some embodiments of the present disclosure.

FIG. 5 is a block diagram of portion 500 of an illustrative system having bypass circuits 560, 570, and 580 installed in the AC bus, in accordance with some embodiments of the present disclosure. As illustrated, portion 500 may correspond to AC bus 284 of FIG. 3, or AC bus 484 of FIGS. 4A-4B in part. AC bus 584 includes effective inductances, capacitances, and resistances (e.g., $C_{emi}$, $L_{emi}$, R), and AC bus lines 585 and 586 (e.g., a line L1 and a neutral, or L1 and L2). In some embodiments, AC bus 584 is partitioned into three lines (e.g., which may be used to smooth the rectified waveform of a DC-AC converter, with the switching of each partition being phase shifted), each having a respective bypass circuit 560, 570, and 580. Each of bypass circuits may include a relay and a resistor, as illustrated by relay 561 and resistor 562 of bypass circuit 560. Relay 561 may be controlled by control circuitry (e.g., charging controller 103 of FIG. 1, control circuitry 280 or OBC 230 of FIGS. 2-3), such that it is open when grid contactor 541 is closed to connect AC bus 584 to grid 550, to prevent large in-rush currents (e.g., as limited by resistor 562). Once grid contactor 541 is closed, and AC capacitor bank 536 is pre-charged, relay 561 may be closed (e.g., the voltage difference at the terminals of relay 561 may be proportional to the resistance of resistor 562, but not a greater value as might be present if hot-plugging). To illustrate, grid 550 operates using a sinusoidal waveform, having an amplitude and frequency (e.g., and phase, for a three-phase system), and AC bus 584 will also operate at that amplitude and frequency once grid contactor 541 is closed. For example, process 600 of GIF. 6 includes closing grid contactor 541 at step 610. In some embodiments, a system need not include bypass circuits because, for example, grid contactor 541 and AC capacitor bank 536 are configured for hot-plugging or the voltage of AC bus 584 is synchronized with the voltage of grid 550. System 400 of FIGS. 4A-4B, as illustrated, does not include AC bypass circuits, for example. For example, process 722 of FIG. 7 includes pre-charging an AC bus to match the grid voltage (e.g., using voltage sensor 590), and then closing the grid contactor once the waveforms are locked. As illustrated in FIG. 5, a system may include voltage sensor 590 (e.g., as part of a battery management system of the OBC, configured for bidirectional charging), which may be configured to measure the voltage waveform of grid 550 in time (e.g., sufficient to determine frequency, phase, and amplitude). In another example, any capacitors coupled across the AC bus, such as capacitors 588 and 589, may still experience in-rush currents when grid contactor 541 is closed even if bypass circuits 560, 570, and 580 are installed. Accordingly, pre-charging the AC bus may less the in-rush currents to such components (e.g., capacitors 588 and 589, grid contactor 541, fuses, or any other suitable components), even if bypass circuits are included.

Figure 6:
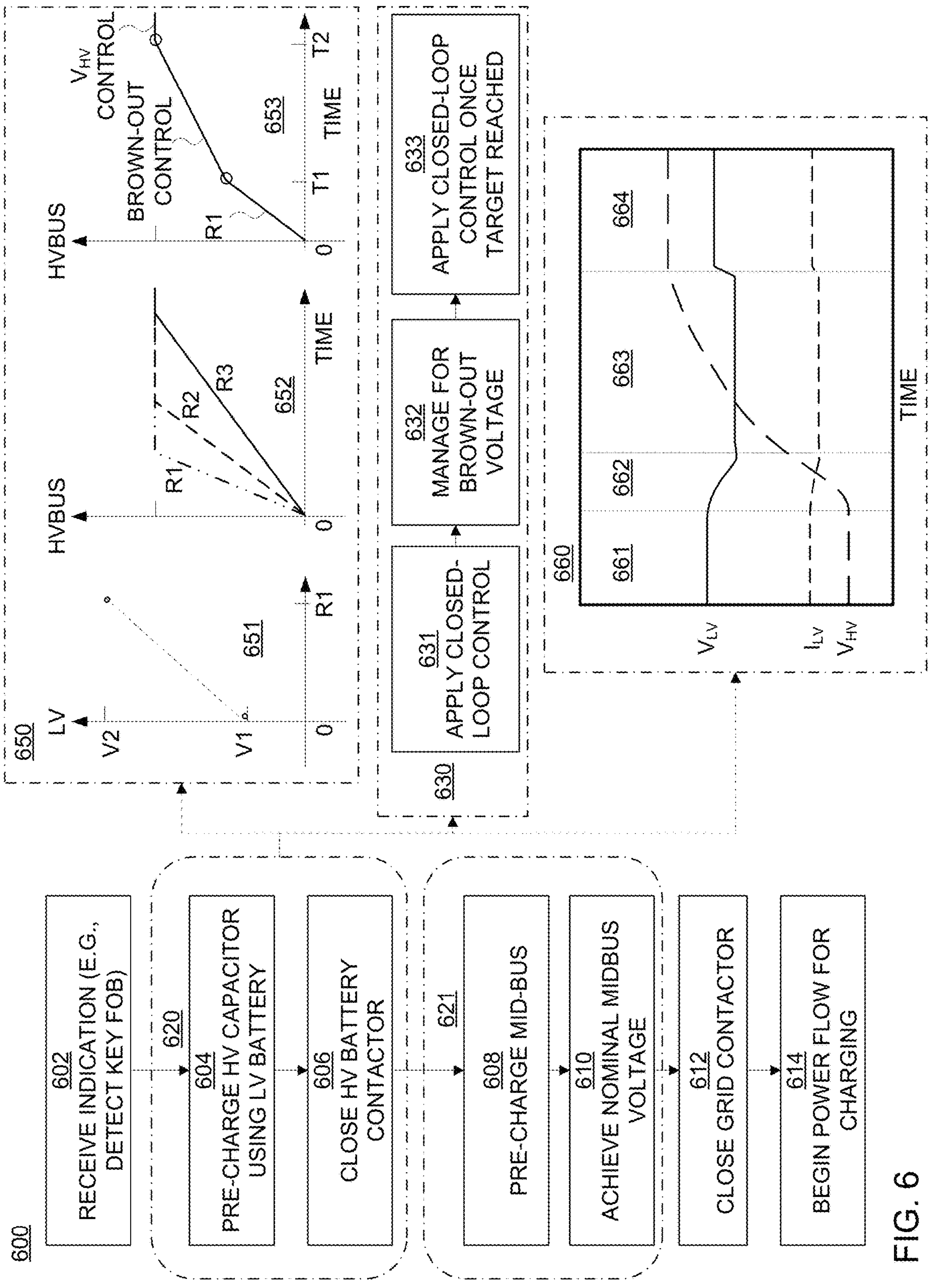
FIG. 6 is a flowchart of an illustrative process for pre-charging a high voltage bus and a mid-bus, in accordance with some embodiments of the present disclosure.

FIG. 6 is a flowchart of illustrative process 600 for pre-charging a high voltage bus and a mid-bus, in accordance with some embodiments of the present disclosure. To illustrate, process 600 may include process 620 directed to pre-charging a high-voltage bus and high-voltage capacitor bank (e.g., similar to operation 291 of FIG. 3), and process 621 directed to pre-charging a mid-bus and mid-bus capacitor bank (e.g., similar to operation 292 of FIG. 3). In an illustrative example, process 600 may be used for pre-charging when the high-voltage battery (e.g., battery 102 of FIG. 1, battery pack 202 of FIGS. 2-3, or battery pack 402 of FIGS. 4A-4B) has adequate SOC (e.g., is not at a critically low SOC), AC capacitors (e.g., AC capacitor bank 436 of FIGS. 4A-4B) are rated to be hot-plugged across live AC voltages (e.g., when grid contactor 241 of FIG. 3, or grid contactor 441 of FIGS. 4A-4B is closed), the grid contactor is rated to be hot-plugged across live AC voltages, a resistive bypass circuit is arranged in parallel with the grid contactor, or any other suitable conditions. In process 600, once the mid-bus is pre-charged, the grid contactor may be closed, without first locking the AC bus voltage waveform with the grid's voltage waveform (e.g., matching frequency, phase, and amplitude of the waveforms). To illustrate, process 600 corresponds to using the low-voltage battery to pre-charge the high-voltage bus, using the high-voltage bus (with high-voltage capacitor bank and battery pack coupled) to pre-charge the mid-bus, and then closing the grid contactor to couple the grid to the high-voltage DC bus for charging (e.g., bi-directional power transfer in either direction). Process 600 may be implemented or otherwise managed by charging controller 103 of FIG. 1, or control circuitry 280 or OBC 230 of FIGS. 2-3.

Step 602 includes receiving an indication (e.g., to begin pre-charge). In some embodiments, step 602 includes detecting a presence of a keyfob associated with a vehicle, and identifying the keyfob. In some embodiments, step 602 includes detecting a mobile device such as a smart phone, or otherwise receiving a command or indication from the mobile device to begin pre-charging. In some embodiments, step 602 may include receiving an indication from a charger, via suitable communications terminals (e.g., of a charging coupler), to begin pre-charging. In some embodiments, step 602 includes receiving an indication to a user interface of the vehicle, such as a touchpad or touchscreen, to begin pre-charging. Step 602 may include receiving any suitable indication that charging is desired (e.g., or using the vehicle battery to power an AC load) and that pre-charging is thus needed.

Step 604 includes pre-charging a high-voltage capacitor coupled across a high-voltage DC bus using a low-voltage battery. In some embodiments, step 604 includes generating and transmitting control signals to switches (e.g., transistors) of a bridge circuit. For example, a DC-DC converter (e.g., DC-DC converter 220 of FIGS. 2-3, or DC-DC converter 420 of FIGS. 4A-4B) may be arranged between a low-voltage DC bus (e.g., low-voltage DC bus 281 of FIG. 3, or low-voltage DC bus 481 of FIGS. 4A-4B) and a high-voltage DC bus (e.g., high-voltage DC bus 282 of FIG. 3, or high-voltage DC bus 482 of FIGS. 4A-4B), and may be configured to transfer power between the two DC buses. A low-voltage battery (e.g., low-voltage battery 210 of FIG. 2, low-voltage battery 210 of FIG. 3, or low-voltage battery 410 of FIGS. 4A-4B), such as a 12V battery used for auxiliary loads (e.g., electric loads 215 of FIG. 2), may be coupled across the low-voltage DC bus (e.g., using one or more contactors). In a further example, a low-voltage capacitor bank may be coupled across the low-voltage DC bus and may be configured to store charge. A high-voltage battery, such as a battery pack used for a drivetrain (e.g., battery 102 of FIG. 1, battery pack 202 of FIGS. 2-3, or battery pack 402 of FIGS. 4A-4B), may be configured to be coupled across the high-voltage DC bus (e.g., using one or more contactors), although the battery pack may be decoupled during step 604 (e.g., high-voltage contactor 222 of FIG. 3, or high-voltage contactor 422 of FIGS. 4A-4B). In a further example, a high-voltage capacitor bank (e.g., high-voltage capacitor bank 223 of FIG. 3, or high-voltage capacitor bank 423 of FIGS. 4A-4B) may be coupled across the high-voltage DC bus and may be configured to store charge. Step 604 may include generating and transmitting control signals (e.g., using charging controller 103 of FIG. 1, control circuitry 280 or OBC 230 of FIGS. 2-3) to the DC-DC converter to transfer energy from the low-voltage DC bus to the high-voltage DC bus, to pre-charge the high-voltage bus. Step 604 may include applying pulse-width modulation, pulse-density modulation, or transmitting any other suitable type of control signal, for example. During pre-charging, the voltage across the high-voltage bus may increase. In some embodiments, for example, step 604 includes closing a contactor to couple the low-voltage battery across the low-voltage DC bus (e.g., if not already coupled), transmitting control signals to the DC-DC converter, monitoring a voltage and/or current of the high-voltage DC bus (e.g., using a voltage or current sensor), achieving a desired voltage of the high-voltage bus (e.g., a nominal voltage, a voltage exceeding a threshold, a setpoint, or any other suitable criteria) by pre-charging the high-voltage capacitor, any other suitable operations, or any combination thereof. Step 604 may occur with a high-voltage contactor open (i.e., the circuits across the contactor are disconnected) such that a high-voltage battery is not coupled across the high-voltage DC bus (e.g., coupled to only one line of the high-voltage DC bus).

Step 606 includes closing a high-voltage battery contactor (e.g., high-voltage contactor 222 of FIG. 3, or high-voltage contactor 422 of FIGS. 4A-4B). For example, after pre-charging the high-voltage capacitor (e.g., high-voltage capacitor bank 223 of FIG. 3, or high-voltage capacitor bank 423 of FIGS. 4A-4B) at step 604, step 606 may include coupling the battery pack (e.g., battery 102 of FIG. 1, battery pack 202 of FIGS. 2-3, or battery pack 402 of FIGS. 4A-4B) across the high-voltage bus (e.g., high-voltage DC bus 282 of FIG. 3). In some embodiments, step 606 includes generating and transmitting a control signal to suitable terminals of the contactor to cause the contactor to close (i.e., connect the circuits). Once the high-voltage battery contactor is closed, the battery pack is coupled to the high-voltage DC bus, and accordingly may exchange DC power with the high-voltage DC bus. Because the voltage difference across the high-voltage contactor is lessened by step 604, step 606 may be performed without damaging the contactor or causing large in-rush currents. In some embodiments, steps 604 and 606 may be combined (e.g., process 620 directed to pre-charging the high-voltage DC bus), wherein the high-voltage DC bus is pre-charged up to a desired voltage and the high-voltage contactor is closed.

Step 608 includes pre-charging a mid-bus (e.g., an intermediate DC bus), using the high-voltage DC bus. In some embodiments, the DC-DC converter coupling the low-voltage DC bus and high-voltage DC bus used at step 604 may be rendered idle during step 608. In some embodiments, the DC-DC converter coupling the low-voltage DC bus and high-voltage DC bus used at step 604 may continue to be controlled during step 608 (e.g., to maintain a voltage of the low-voltage DC bus, to maintain SOC of the low-voltage battery, to power low-voltage DC bus loads, or a combination thereof). In some embodiments, step 608 includes generating and transmitting control signals to switches (e.g., transistors) of a bridge circuit. For example, a DC-DC converter (e.g., OBC DAB 234 of FIG. 3) may be arranged between the high-voltage DC bus (e.g., high-voltage DC bus 282 of FIG. 3) and the mid-bus (e.g., mid-bus 283 of FIG. 3), and may be configured to transfer power between the two DC buses. A mid-bus capacitor bank (e.g., mid-bus capacitor bank 231 of FIG. 3), may be coupled across the mid-bus. Step 608 may include generating and transmitting the control signals (e.g., using charging controller 103 of FIG. 1, control circuitry 280 or OBC 230 of FIGS. 2-3) to the DC-DC converter to transfer energy from the high-voltage DC bus (e.g., from the high-voltage capacitor bank coupled thereof) to the mid-bus, to pre-charge the mid-bus (e.g., the mid-bus capacitor bank). Step 608 may include applying pulse-width modulation, pulse-density modulation, or transmitting any other suitable type of control signal, for example. During pre-charging, the voltage across the mid-bus may increase. In some embodiments, for example, step 608 includes transmitting control signals to the DC-DC converter, monitoring a voltage and/or current of the mid-bus (e.g., using a voltage or current sensor), achieving a desired voltage of the mid-bus (e.g., a nominal voltage, a voltage exceeding a threshold, a setpoint, or any other suitable criteria) by pre-charging the mid-bus capacitor bank, any other suitable operations, or any combination thereof. In some embodiments, for example, step 608 may include transmitting a control signal corresponding to a predetermined ramp rate in mid-bus voltage, which may be based on maximum current or any other criteria.

Step 610 includes achieving a nominal mid-bus voltage. During pre-charging at step 608, the voltage across the mid-bus may increase. In some embodiments, step 610 includes monitoring a voltage and/or current of the mid-bus (e.g., using a voltage or current sensor), achieving a desired voltage of the mid-bus (e.g., a nominal voltage, a voltage exceeding a threshold, a setpoint, or any other suitable criteria) by pre-charging the mid-bus capacitor bank, any other suitable operations, or any combination thereof. In some embodiments, steps 610 and 608 may be combined (e.g., process 621 directed to pre-charging the mid-bus), wherein the mid-bus is pre-charged up to a desired voltage.

Step 612 includes closing a grid contactor (e.g., grid contactor 241 of FIG. 3, or grid contactor 441 of FIGS. 4A-4B). In some embodiments, step 612 includes generating and transmitting a control signal to suitable terminals of the grid contactor to cause the grid contactor to close (i.e., connect the grid to the OBC). Once the grid contactor is closed, the AC system (e.g., AC system 150 of FIG. 1, or grid 250 of FIG. 3) is electrically coupled to the OBC (e.g., OBC 230 of FIGS. 2-3, or OBC PFC 235 of FIG. 3), and accordingly may exchange AC power with the OBC. For example, in some embodiments, a bypass circuit may be included in each AC line of the AC bus (e.g., bypass circuits 560, 570, and 580, as illustrated in FIG. 5). The bypass circuit may include a resistor in parallel with a relay, where the relay provides a reduced-resistance path for current flow. With the relay open, the grid contactor may be closed at step 612, and the resistor limits the current flow (e.g., to protect the AC capacitor bank). Once the AC capacitor bank is charged (e.g., locked with the voltage grid), the relay may then be closed to allow a current path having less resistance (e.g., effectively bypassing the resistor in parallel similar to a shunt). In some embodiments, the system need not include the bypass circuit if, for example, the AC capacitor bank is configured for hot plugging, or otherwise if the AC voltages are sufficiently matched prior to closing the grid contactor (e.g., as discussed in the context of process 722 of FIG. 7).

Step 614 includes beginning power flow for charging. In some embodiments, the system is configured for bidirectional charging, wherein power may be transferred from the grid to the battery pack of the vehicle or power may be transferred from the battery pack of the vehicle to an AC system. In some embodiments, step 614 includes generating and transmitting control signals to DC-DC converters (e.g., DC-DC converter 220 of FIGS. 2-3, and OBC DAB 234 of FIG. 3), generating and transmitting control signals to DC-AC converters (e.g., OBC 230 of FIGS. 2-3, OBC PFC 235 of FIG. 3), measuring one or more electrical parameters (e.g., voltage, current, impedance, frequency) using any suitable sensor, monitoring a SOC of a battery, monitoring a state of health of a battery, any other suitable operations, or any combination thereof.

In an illustrative example, panel 650 shows a plot of low-voltage battery voltage and high-voltage DC bus pre-charge rate (e.g., for step 604 of process 600). The abscissa is pre-charge rate (V/s), and the ordinate is low-voltage battery voltage (e.g., starting voltage, or instantaneous voltage). In some embodiment, as illustrated in the plot 651 of panel 650, the pre-charge rate may be derated as the low-voltage battery voltage drops, which in turn may limit the peak low-voltage battery current drawn during pre-charging. For example, this limit may be a suitable value corresponding to the low-voltage battery's SOC and also may prevent drawing current from the LV battery if it is at zero or otherwise critically low SOC. In some embodiments, the controller may derate the pre-charge current draw rate profile by determining or receiving information regarding the peak battery current allowed for the low-voltage battery, to address the case where different batteries may have different SOC vs voltage characteristics, for example. In an illustrative example, V1 may be 10.5V, V2 may be 13.5V and R1 may be 900 V/s, although the low-voltage battery may operate at any suitable voltage range, and any suitable pre-charge rate may be applied. Plot 652 shows voltage of the high-voltage DC bus for different ramp rates R1>R2>R3, up to a target value, for example. It will be understood that voltage traces of the high-voltage DC bus need not be linear, and that plots 651 and 652 are illustrative.

In some embodiments, step 604 may include using a maximum or otherwise constant pre-charge rate (e.g., 900 V/s or any suitable maximum value) initially, and then monitoring the voltage of the low-voltage battery for brown-out conditions, for which the current draw may be lessened and controlled to maintain the low-voltage battery voltage). If no brown-out occurs, then the low-voltage battery current draw may remain at the maximum value (e.g., until brown-out occurs or the high-voltage DC bus reaches the target voltage). As the pre-charging rate increases, the time for pre-charging decreases, although the peak current draw and voltage drop may be greater. For example, if no brown-out occurs, the voltage of the high-voltage DC bus may follow the R1 trace of plot 652. Plot 653 shows an instance where brown-out occurs. Initially, the high-voltage DC bus is charged at the maximum rate (e.g., as limited by the low-voltage current draw), and then at time T1 brown-out is detected (e.g., the voltage of the low-voltage battery dripped to below a predetermined threshold). Step 604 may include reducing the pre-charging rate from time T1 until the target voltage value of the high-voltage DC bus is reached at time T2. The pre-charging rate between T1 and T2 may be controlled to maintain the low-voltage battery voltage at a target value (e.g., greater than or equal to the brown-out voltage). Then, starting at time T2, step 604 may include maintaining the target voltage of the high-voltage DC bus using feedback control on the voltage of the high-voltage DC bus. It will be understood that voltage traces of the high-voltage DC bus need not be linear, and that plot 653 is illustrative.

In another illustrative example, step 604 may include performing process 630 to pre-charge the high-voltage DC bus. Step 631 may include applying closed loop control to pre-charge the high-voltage bus. For example, step 631 may include applying closed loop control to low-voltage battery current draw, high-voltage DC bus voltage, any other suitable controllable parameter, or any combination thereof. In a further example, step 631 may include controlling the current drawn from the LV battery with a fixed ramp rate. In a further example, a maximum value of low-voltage battery current draw reference may be the current that has caused (or would be expected to cause) brown-out of low-voltage bus. If there is no brown-out, the maximum current draw value would be determined from the required rate of pre-charge, and step 632 might not be needed. Step 632 may include managing for brown-out of the low-voltage battery, where the voltage of the low-voltage battery drops below a threshold. For example, step 632 may include controlling the low-voltage battery current draw to hold the low-voltage DC bus voltage at the low-voltage battery brown-out voltage limit (e.g., which may be 10.5V for a 12V battery, or any other suitable value). In a further example, step 632 may include monitoring the low-voltage DC bus voltage to determine whether brown-out is imminent or has occurred. In an illustrative example, step 604 may include applying closed loop control of high-voltage DC bus voltage until brown-out is detected, then applying closed loop control of low-voltage battery current draw to maintain the low-voltage battery voltage (e.g., at the brown-out limit), and then, once the high-voltage DC bus voltage reaches the target value, applying closed loop control of the high-voltage DC bus voltage. To illustrate, brown-out monitoring might not be possible, or otherwise be difficult, if the high-voltage DC bus was directly controlled from the start at step 631, and then control had to be switched to low-voltage bus voltage control or low-voltage battery current draw control. In some embodiments, step 632 may include switching to another feedback control such as low-voltage bus voltage control during brown-out, and may require additional logic to handover control variables from one control loop to the other. This handover may be avoided by controlling low-voltage battery current draw. Once the high-voltage DC bus reaches the target nominal bus voltage (e.g., an intended operating voltage or otherwise a predetermined voltage that may correspond to the high-voltage battery pack), step 633 may include applying closed-loop control to maintain the high-voltage DC bus voltage in steady state. For example, if a brown-out occurs and is detected at step 632, after the high-voltage DC bus has reached the target voltage, the control would again have to be switched to high-voltage DC bus voltage control at step 633 to hold the bus at the target value. Otherwise, the bus voltage would keep on rising. As an illustrative example, of process 630, the low-voltage battery current draw may ramp up until the low-voltage DC bus voltage brown-out limit is reached, after which the low-voltage battery current is held at the value corresponding to the brown-out voltage limit. Then, once the high-voltage DC bus voltage reaches the target value, the control shifts to a relatively slower high-voltage DC bus voltage control to draw small power in steady state and compensate for losses.

In another illustrative example, panel 660 shows an example of brown-out control of the low-voltage DC bus while pre-charging at step 604 of process 600. Note that the plot in panel 660 includes different vertical scales for the three traces (e.g., with voltages being positive values, and current being a negative value, as illustrated). In some embodiments, during pre-charging the high-voltage capacitor bank, the low-voltage battery current draw ($I_{LV}$) follows a ramped reference having a ramp rate that governs the speed of pre-charge (e.g., note that, as illustrated, current draw is negative so the ramp is downwards, while voltage are shown as positive). The pre-charge power draw may be equal to the product of the high-voltage DC bus voltage, high-voltage DC bus capacitance, and the voltage ramp rate. Once the voltage across the high-voltage DC bus ($V_{HV}$) reaches a target value (e.g., a predetermined nominal value such as 450V or 900V or any other suitable value), the high-voltage DC bus is controlled to this target voltage setpoint (e.g., in steady state). For example, during the ramp-up of low-voltage battery current, the voltage across the low-voltage battery ($V_{LV}$) may decrease due to the equivalent series resistance (ESR) of the low-voltage battery. When the voltage across the low-voltage battery drops to the brown-out voltage (e.g., a predetermined voltage threshold), the low-voltage current draw is controlled to clamp the low-voltage battery voltage at the brown-out limit. For example, if the brown-out voltage is 10.5V for the low-voltage battery, then the controller controls the low-voltage current draw to maintain the 10.5V (e.g., at least) across the low-voltage DC bus. Region 661 corresponds to a time period before step 604, region 662 corresponds to a time period of low-voltage battery current draw $I_{LV}$ control at a fixed ramp rate setpoint, region 663 corresponds to a time period of low-voltage battery current draw $I_{LV}$ control to maintain low-voltage battery brown-out limit, and region 664 corresponds to a time period of high-voltage DC bus voltage control to maintain $V_{HV}$ (e.g., using steady-state control).

In a further illustrative example, process 600 may include receiving an indication to pre-charge a high-voltage DC bus at step 602, transmitting a control signal (while a high-voltage battery is not coupled across the high-voltage DC bus) to a DC-DC converter coupled between the low-voltage DC bus and the high-voltage DC bus at step 604, and closing a contactor arranged between the high-voltage DC bus and the high-voltage battery to connect the high-voltage battery across the high-voltage DC bus at step 606. For example, the DC-DC converter may be configured to transfer power from a low-voltage DC bus to the high-voltage DC bus to pre-charge a capacitor at step 604 connected across the high-voltage DC bus based on the control signal. In a further example, the low-voltage DC bus is connected to a low-voltage battery. To illustrate, the high-voltage battery may be configured to operate at a first nominal voltage greater than 100 V and may be configured to provide electric power to a drivetrain, while the low-voltage battery may be configured to operate at a second nominal voltage less than 15.5 V and may be configured to provide power to electric loads other than the drivetrain. The control signal may be a first control signal (e.g., for pre-charging the high-voltage DC bus), the capacitor may be a first capacitor (e.g., a high-voltage capacitor), the DC-DC converter may be a first DC-DC converter, a second DC-DC converter may be configured to transfer power between the high-voltage DC bus and an intermediate DC bus (e.g., a mid-bus), the intermediate DC bus may be coupled to a DC-AC converter, and the DC-AC converter may be coupled to an AC bus and a grid contactor. After closing the high-voltage contactor at step 606, but before closing the grid contactor at step 612, process 600 may include transmitting a second control signal to the second DC-DC converter to pre-charge a second capacitor (e.g., a mid-bus capacitor bank) coupled across the intermediate DC bus at step 608.

Figure 7:
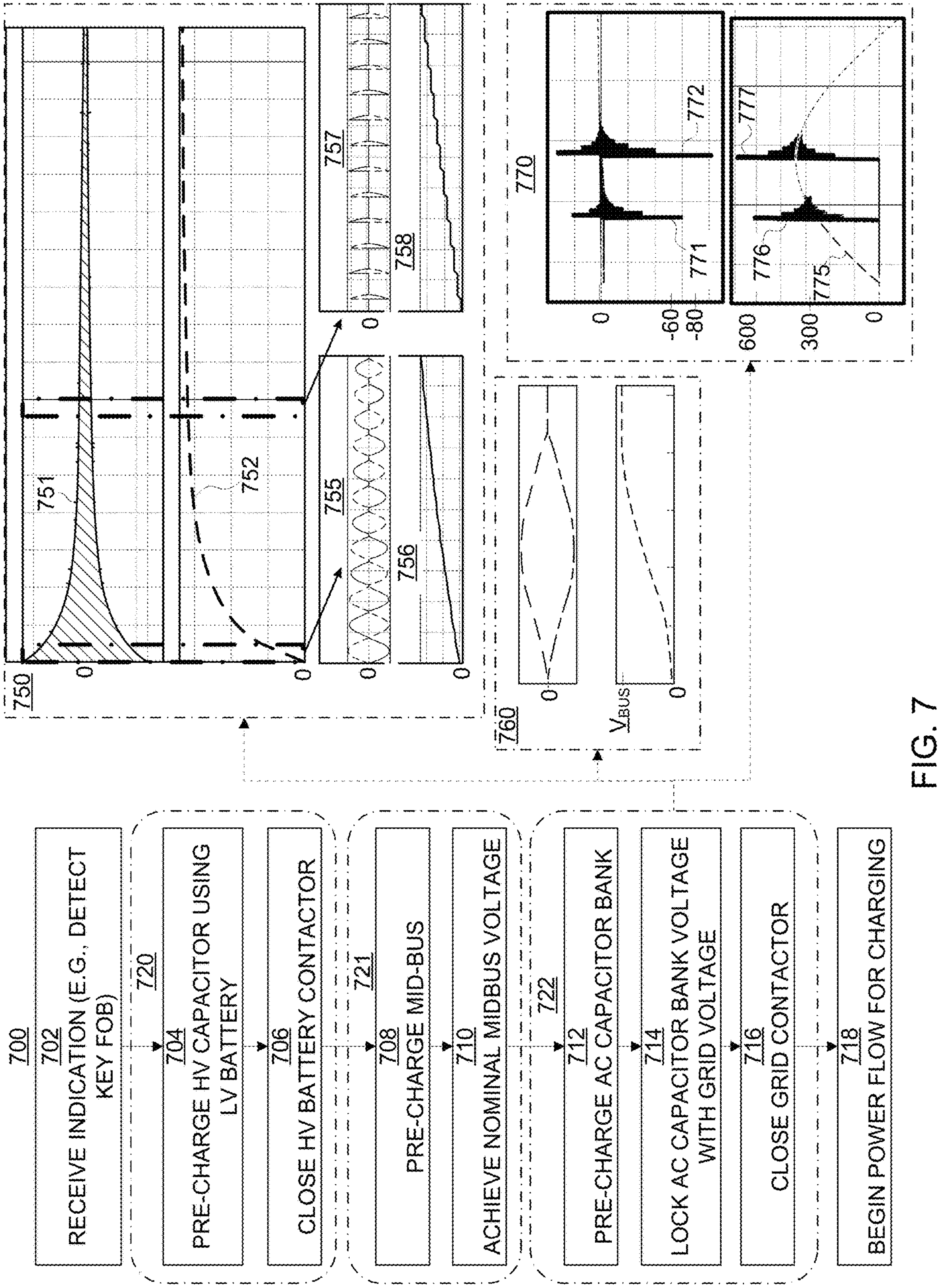
FIG. 7 is a flowchart of another illustrative process for pre-charging a high voltage bus and a mid-bus, including synchronizing AC voltages, in accordance with some embodiments of the present disclosure.

FIG. 7 is a flowchart of illustrative process 700 for pre-charging a high voltage bus and a mid-bus, including synchronizing AC voltages, in accordance with some embodiments of the present disclosure. To illustrate, process 700 may include process 720 directed to pre-charging a high-voltage bus and high-voltage capacitor bank (e.g., similar to operation 291 of FIG. 3), process 721 directed to pre-charging a mid-bus and mid-bus capacitor bank (e.g., similar to operation 292 of FIG. 3), and process 722 directed to pre-charging an AC bus and AC capacitor bank (e.g., similar to operation 294 of FIG. 3). Process 700 may be implemented or otherwise managed by charging controller 103 of FIG. 1, or control circuitry 280 or OBC 230 of FIGS. 2-3. In an illustrative example, process 600 may be used when an AC capacitor bank and grid contactor is rated to be hot-plugged across live AC, but if either component is not configured for hot-plugging (or AC bus current must otherwise be limited), then process 700 may be used. Process 700 may also extend the life of components on the AC bus, or allow less expensive or lower-rated components to be used.

Step 702 includes receiving an indication (e.g., to begin pre-charge). In some embodiments, step 702 includes detecting a presence of a keyfob associated with a vehicle, and identifying the keyfob. In some embodiments, step 702 includes detecting a mobile device such as a smart phone, or otherwise receiving a command or indication from the mobile device to begin pre-charging. In some embodiments, step 702 may include receiving an indication from a charger, via suitable communications terminals (e.g., of a charging coupler), to begin pre-charging. In some embodiments, step 702 includes receiving an indication to a user interface of the vehicle, such as a touchpad or touchscreen, to begin pre-charging. Step 702 may include receiving any suitable indication that charging is desired (e.g., or using the vehicle battery to power an AC load) and that pre-charging is thus needed.

Step 704 includes pre-charging a high-voltage capacitor using a low-voltage battery, and may be the same as step 604 of process 600 of FIG. 6. In some embodiments, step 704 includes generating and transmitting control signals to switches (e.g., transistors) of a bridge circuit. For example, a DC-DC converter (e.g., DC-DC converter 220 of FIGS. 2-3) may be arranged between a low-voltage DC bus (e.g., low-voltage DC bus 281 of FIG. 3) and a high-voltage DC bus (e.g., high-voltage DC bus 282 of FIG. 3), and may be configured to transfer power between the two DC buses. A low-voltage battery (e.g., low-voltage battery 210 of FIG. 2), such as a 12V battery used for auxiliary loads (e.g., electric loads 215 of FIG. 2), may be coupled across the low-voltage DC bus (e.g., using one or more contactors). In a further example, a low-voltage capacitor bank may be coupled across the low-voltage DC bus and may be configured to store charge. A high-voltage battery, such as a battery pack used for a drivetrain (e.g., battery 102 of FIG. 1, battery pack 202 of FIGS. 2-3), may be configured to be coupled across the high-voltage DC bus (e.g., using one or more contactors), although the battery pack may be decoupled during step 604 (e.g., high-voltage contactor 222 of FIG. 3). In a further example, a high-voltage capacitor bank (e.g., high-voltage capacitor bank 223 of FIG. 3) may be coupled across the high-voltage DC bus and may be configured to store charge. Step 704 may include generating and transmitting control signals (e.g., using charging controller 103 of FIG. 1, control circuitry 280 or OBC 230 of FIGS. 2-3) to the DC-DC converter to transfer energy from the low-voltage DC bus to the high-voltage DC bus, to pre-charge the high-voltage bus. Step 704 may include applying pulse-width modulation, pulse-density modulation, or transmitting any other suitable type of control signal, for example. During pre-charging, the voltage across the high-voltage bus may increase. In some embodiments, for example, step 704 includes closing a contactor to couple the low-voltage battery across the low-voltage DC bus (e.g., if not already coupled), transmitting control signals to the DC-DC converter, monitoring a voltage and/or current of the high-voltage DC bus (e.g., using a voltage or current sensor), achieving a desired voltage of the high-voltage bus (e.g., a nominal voltage, a voltage exceeding a threshold, a setpoint, or any other suitable criteria) by pre-charging the high-voltage capacitor, any other suitable operations, or any combination thereof. Step 704 may occur with a high-voltage contactor open such that a high-voltage battery is not coupled across the high-voltage DC bus (e.g., coupled to only one line of the high-voltage DC bus).

Step 706 includes closing a high-voltage battery contactor (e.g., high-voltage contactor 222 of FIG. 3). For example, after pre-charging the high-voltage capacitor (e.g., high-voltage capacitor bank 223 of FIG. 3) at step 704, step 706 may include coupling the battery pack (e.g., battery 102 of FIG. 1, battery pack 202 of FIGS. 2-3) across the high-voltage bus (e.g., high voltage DC bus 282 of FIG. 3). In some embodiments, step 706 includes generating and transmitting a control signal to suitable terminals of the contactor to cause the contactor to close (i.e., connect the circuits). Once the high-voltage battery contactor is closed, the battery pack is coupled to the high-voltage DC bus, and accordingly may exchange DC power with the high-voltage DC bus. Because the voltage difference across the high-voltage contactor is lessened by step 704, step 706 may be performed without damaging the contactor or causing large in-rush currents.

Step 708 includes pre-charging a mid-bus (e.g., an intermediate DC bus), using the high-voltage DC bus. In some embodiments, the DC-DC converter coupling the low-voltage DC bus and high-voltage DC bus used at step 704 may be rendered idle during step 708 (e.g., such that no power transfer occurs across that DC-DC converter). In some embodiments, the DC-DC converter coupling the low-voltage DC bus and high-voltage DC bus used at step 704 may continue to be controlled during step 708 (e.g., to maintain a voltage of the low-voltage DC bus, to maintain SOC of the low-voltage battery, to power low-voltage DC bus loads, or a combination thereof). In some embodiments, step 708 includes generating and transmitting control signals to switches (e.g., transistors) of a bridge circuit. For example, a DC-DC converter (e.g., OBC DAB 234 of FIG. 3) may be arranged between the high-voltage DC bus (e.g., high-voltage DC bus 282 of FIG. 3) and the mid-bus (e.g., mid-bus 283 of FIG. 3), and may be configured to transfer power between the two DC buses. A mid-bus capacitor bank (e.g., mid-bus capacitor bank 231 of FIG. 3), may be coupled across the mid-bus. Step 708 may include generating and transmitting the control signals (e.g., using charging controller 103 of FIG. 1, control circuitry 280 or OBC 230 of FIGS. 2-3) to the DC-DC converter to transfer energy from the high-voltage DC bus (e.g., from the high-voltage capacitor bank coupled thereof) to the mid-bus, to pre-charge the mid-bus (e.g., the mid-bus capacitor bank). Step 708 may include applying pulse-width modulation, pulse-density modulation, or transmitting any other suitable type of control signal, for example. During pre-charging, the voltage across the mid-bus may increase. In some embodiments, for example, step 708 includes transmitting control signals to the DC-DC converter, monitoring a voltage and/or current of the mid-bus (e.g., using a voltage or current sensor), achieving a desired voltage of the mid-bus (e.g., a nominal voltage, a voltage exceeding a threshold, a setpoint, or any other suitable criteria) by pre-charging the mid-bus capacitor bank, any other suitable operations, or any combination thereof.

Step 710 includes achieving a nominal mid-bus voltage. During pre-charging at step 708, the voltage across the mid-bus may increase. In some embodiments, step 710 includes monitoring a voltage and/or current of the mid-bus (e.g., using a voltage or current sensor), achieving a desired voltage of the mid-bus (e.g., a nominal voltage, a voltage exceeding a threshold, a setpoint, or any other suitable criteria) by pre-charging the mid-bus capacitor bank, any other suitable operations, or any combination thereof. In some embodiments, steps 710 and 708 may be combined (e.g., process 721 directed to pre-charging the mid-bus), wherein the mid-bus is pre-charged up to a desired voltage.

Step 712 includes pre-charging an AC capacitor bank (e.g., AC capacitor bank 436 of FIGS. 4A-4B), and step 714 includes locking a voltage of the AC capacitor bank with a voltage of an AC grid (e.g., AC system 150 of FIG. 1, grid 250 of FIG. 3). In some embodiments, steps 714 and 712 may be combined (e.g., process 722 directed to pre-charging the AC capacitor bank), wherein the AC bus is pre-charged up to a desired voltage or otherwise synchronized with an AC system. In some embodiments, step 712 includes measuring a voltage of the AC system (e.g., AC system 150 of FIG. 1, or grid 250 of FIG. 3) using a suitable voltage sensor (e.g., sensor 470 of FIGS. 4A-4B), and pre-charging the AC capacitor bank coupled across the AC bus (e.g., AC Bus 284 of FIG. 3, or AC bus 484 of FIGS. 4A-4B) to match the voltage of the AC system. In some embodiments, step 712 is performed with a grid contactor (e.g., grid contactor 241 of FIG. 3, or grid contactor 441 of FIGS. 4A-4B) open such that the AC system is disconnected from the AC bus. To illustrate, the AC system may operate at a suitable voltage having a sinusoidal character (e.g., with a frequency of 60 Hz). For example, the AC system may operate at 240 VAC, 120 VAC, or any other suitable voltage, and may include single-phase, or 3-phase operation. As the AC bus is pre-charged, at step 714 the voltage of the AC bus is matched (e.g., synchronized in phase) to the AC system. For example, a phase-locked loop controller may be used to achieve step 714. In some embodiments, step 714 includes monitoring a phase difference between the AC bus and the AC system over time until step 716 is performed.

Step 716 includes closing a grid contactor (e.g., grid contactor 241 of FIG. 3, or grid contactor 441 of FIGS. 4A-4B). In some embodiments, the system need not include a bypass circuit such as those illustrated in FIG. 5 if, for example, the AC capacitor bank is configured for hot plugging, or otherwise if the AC voltages are sufficiently matched at step 714. In some embodiments, step 716 includes generating and transmitting a control signal to suitable terminals of the grid contactor to cause the grid contactor to close (i.e., connect the grid to the OBC). Once the grid contactor is closed, the AC system (e.g., AC system 150 of FIG. 1, or grid 250 of FIG. 3) is electrically coupled to the OBC (e.g., OBC 230 of FIGS. 2-3, or OBC PFC 235 of FIG. 3), and accordingly may exchange AC power with the OBC.

Step 718 includes beginning power flow for charging. In some embodiments, the system is configured for bidirectional charging, wherein power may be transferred from the grid to the battery pack of the vehicle or power may be transferred from the battery pack of the vehicle to an AC system. In some embodiments, step 718 includes generating and transmitting control signals to DC-DC converters (e.g., DC-DC converter 220 of FIGS. 2-3, OBC 230 of FIG. 2, and OBC DAB 234 of FIG. 3), generating and transmitting control signals to DC-AC converters (e.g., OBC 230 of FIGS. 2-3, OBC PFC 235 of FIG. 3), measuring one or more electrical parameters (e.g., voltage, current, impedance, frequency) using any suitable sensor, monitoring a SOC of a battery, monitoring a state of health of a battery, any other suitable operations, or any combination thereof.

In another illustrative example, panel 750 shows AC bus current and voltage (e.g., RMS voltage) during pre-charging at steps 712 and 714. As the AC bus is brought up to voltage (e.g., as the waveform is achieved), the required current decreases, and it much less than the current that would arise in the AC bus if the grid contactor were hot-plugged without pre-charging. For example, during pre-charging of the AC bus, the high-voltage DC bus voltage (e.g., voltage trace 752) may rise, and the pre-charging current (e.g., current trace 751) may start at an initial value (e.g., ranging from −5 to 5 Amps, as illustrated) and decrease in time as the nominal bus voltage is reached. Plot 756 provides an example of the voltage increase from 0V to about 120V, occurring early in pre-charging, with corresponding AC bus current ranging from −5 to 5 Amps (as illustrated in plot 755). Plot 758 provides an example of the voltage increase from 316V to about 318V, occurring as steady state is almost reached, with corresponding AC bus current ranging from −0.5 to 0.5 Amps (as illustrated in plot 757). These AC bus current draw magnitudes are much less than would be expected if a grid contactor were hot-plugged.

In another illustrative example, panel 760 shows an example of AC bus voltage and current where the grid contactor is closed without AC pre-charging. As illustrated, once the grid contactor is closed, the AC bus voltage (e.g., the RMS voltage as illustrated in the bottom plot) increases to the grid voltage, and the current of each AC line (e.g., the two traces of the top plot) peaks and then tends to zero as the AC bus matches the grid voltage after the grid contactor is closed. The peak current may be hundreds of amps, for example, if the AC bus is not pre-charged. If the AC bus is pre-charged, using process 722 for example, the peak currents after grid contactor closure may be as low as below 10 amps, because the in-rush current is lessened. Accordingly, process 722 may be used to lessen peak currents in the AC bus and corresponding components when the grid contactor is closed. The span of time illustrated in panel 760 may be about 5 seconds, although an AC bus may be charged at any suitable rate.

In another illustrative example, panel 770 shows the current and voltage on the grid-side during grid contactor closure, at two separate times during the voltage waveform, without AC pre-charging and with bypass circuits. Current trace 771 corresponds to grid closure at the 45° phase of the grid waveform, while current trace 772 corresponds to the peak AC voltage of the grid waveform. Voltage trace 776 corresponds to grid closure at the 45° phase of the grid waveform (voltage trace 775), while voltage trace 777 corresponds to the peak AC voltage of the grid waveform. The top plot shows grid-side fuse currents (e.g., at a main panel or subpanel of the grid), while the bottom plot shows the grid side voltage waveform, and the AC bus voltage waveforms during grid contactor closure at the two different times. To illustrate, the peak currents may reach over 80 Amps (e.g., current trace 772), for example, and the voltage excursions may range from 200 to 570 V (e.g., voltage trace 777), with peak current and voltage fluctuations being more extreme when the grid contactor is closed at the peak of the voltage waveform. In some embodiments, pre-charging the AC bus using process 722 may allow components having lower ratings to be used, which may allow cost savings, and also may allow for improved life of components.

In a further illustrative example, process 700 may include receiving an indication to pre-charge a high-voltage DC bus at step 702, transmitting a first control signal (while a high-voltage battery is not coupled across the high-voltage DC bus) to a DC-DC converter coupled between the low-voltage DC bus and the high-voltage DC bus at step 704, and closing a contactor arranged between the high-voltage DC bus and the high-voltage battery to connect the high-voltage battery across the high-voltage DC bus at step 706. After closing the high-voltage contactor at step 706, but before closing the grid contactor at step 716, process 700 may include transmitting a second control signal to the second DC-DC converter to pre-charge a second capacitor (e.g., a mid-bus capacitor bank) coupled across the intermediate DC bus at step 708. Process 700 may also include, while the grid contactor is open and before closing it at step 716, transmitting a third control signal to the DC-AC converter to pre-charge a third capacitor (e.g., an AC capacitor bank) coupled across the AC bus.

In another illustrative example, process 700 may include causing a first DC bus, while a high-voltage battery is decoupled from the first DC bus, to be pre-charged by a low-voltage battery using a first DC-DC converter coupled between the first DC bus and the low-voltage battery at step 704. Process 700 may also include causing a second DC bus to be pre-charged using a second DC-DC converter coupled between the first DC bus and the second DC bus at steps 708 and 710. Process 700 may also include causing an AC bus to be pre-charged, while an AC contactor coupled between the AC bus and an AC system is open (e.g., before step 716), using a DC-AC converter coupled to the second DC bus and to the AC bus at step 714. Process 700 may further include closing the first contactor (e.g., a high-voltage contactor) after causing the first DC bus, the second DC bus, and the AC bus to be pre-charged. In some embodiments, process 700 includes closing the grid contactor after causing the first DC bus, the second DC bus, and the AC bus to be pre-charged. Regarding pre-charging the AC bus, process 700 may include receiving a sensor signal from a voltage sensor coupled to the AC system at step 712, causing the AC bus to be pre-charged by matching a first voltage of the AC bus to a second voltage of the AC system based on the sensor signal at step 712, and causing the AC contactor to be closed at step 716 after matching the first voltage to the second voltage at step 714.

Figure 8:
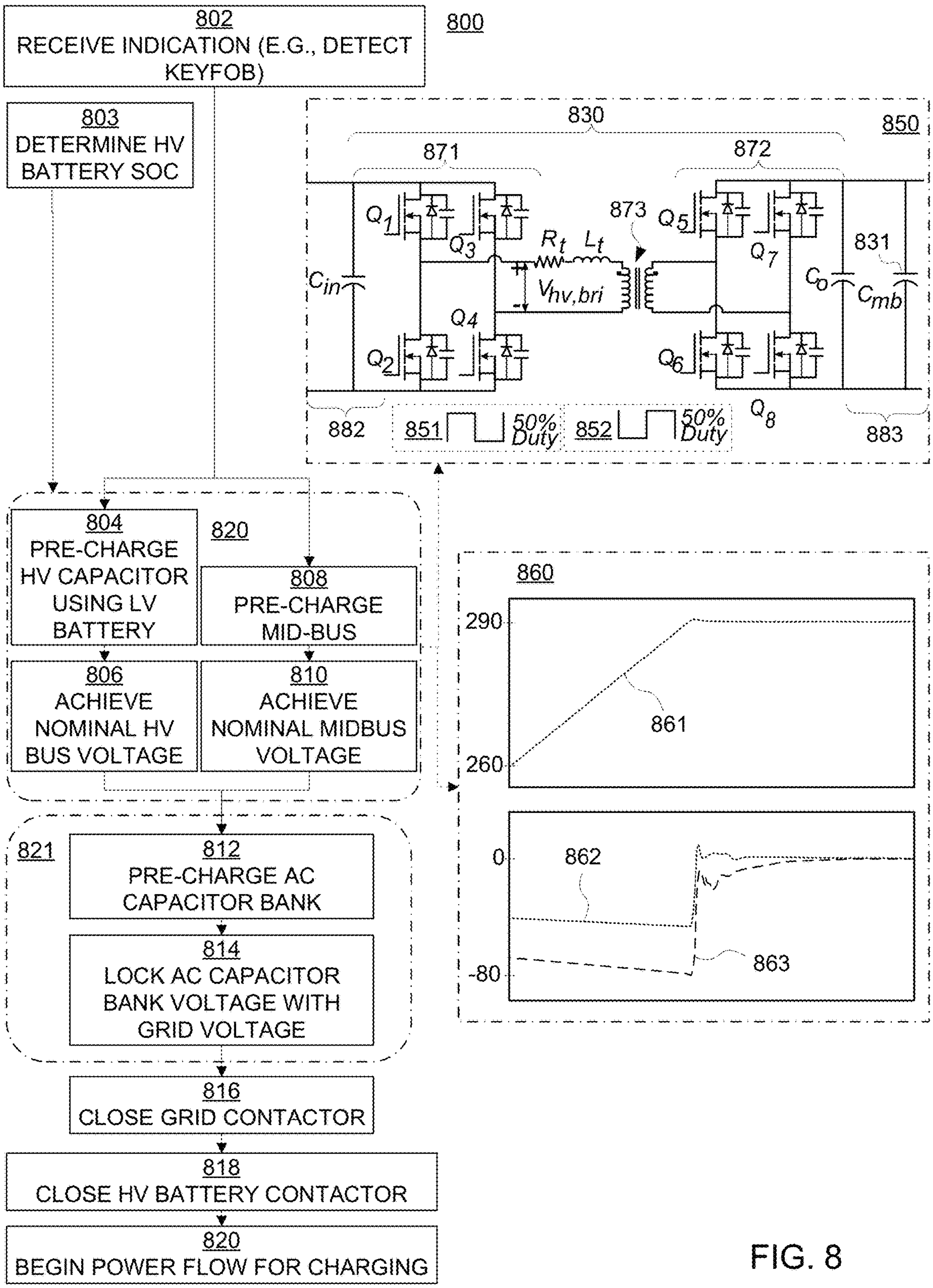
FIG. 8 is a flowchart of another illustrative process for pre-charging a high voltage bus and a mid-bus, when the HV battery is at a low SOC, in accordance with some embodiments of the present disclosure.

FIG. 8 is a flowchart of illustrative process 800 for pre-charging a high voltage bus and a mid-bus, when the HV battery is at a low SOC, in accordance with some embodiments of the present disclosure. To illustrate, process 800 may include process 820 directed to pre-charging a high-voltage bus, high-voltage capacitor bank, mid-bus, and mid-bus capacitor bank (e.g., similar to operation 293 of FIG. 3), and process 821 directed to pre-charging an AC bus and AC capacitor bank (e.g., similar to operation 294 of FIG. 3). Process 800 may be implemented or otherwise managed by charging controller 103 of FIG. 1, or control circuitry 280 or OBC 230 of FIGS. 2-3. In an illustrate example, processes 600 or 700 may be used when the high-voltage battery has sufficient SOC to pre-charge the mid-bus. Process 800 may be used if the high-voltage battery does not have sufficient SOC, or otherwise is not available for pre-charging.

Step 802 includes receiving an indication (e.g., to begin pre-charge). In some embodiments, step 802 includes detecting a presence of a keyfob associated with a vehicle, and identifying the keyfob. In some embodiments, step 802 includes detecting a mobile device such as a smart phone, or otherwise receiving a command or indication from the mobile device to begin pre-charging. In some embodiments, step 802 may include receiving an indication from a charger, via suitable communications terminals (e.g., of a charging coupler), to begin pre-charging. In some embodiments, step 802 includes receiving an indication to a user interface of the vehicle, such as a touchpad or touchscreen, to begin pre-charging. Step 802 may include receiving any suitable indication that charging is desired (e.g., or using the vehicle battery to power an AC load) and that pre-charging is thus needed.

Step 803 includes determining an SOC of the high-voltage battery (e.g., battery 102 of FIG. 1, battery pack 202 of FIGS. 2-3, or battery pack 402 of FIGS. 4A-4B). In some embodiments, step 803 includes measuring a voltage of the high-voltage battery pack, a voltage-current characteristic of the high-voltage battery pack, any other suitable metric from which an SOC may be determined, or combination thereof. In some embodiments, step 803 need not include explicitly determining a SOC but rather a metric indicative of SOC. In some embodiments, for example, step 803 may include measuring a voltage across the high-voltage battery and comparing the measured voltage to a threshold or other reference value to determine that the high-voltage battery has insufficient charge to pre-charge or otherwise be connected across the high-voltage bus before the grid contactor is closed at step 816.

Step 804 includes pre-charging a high-voltage capacitor using a low-voltage battery. Step 804 includes pre-charging a high-voltage capacitor using a low-voltage battery, and may be the same as, or similar to, step 604 of process 600 of FIG. 6 or step 704 of process 700 of FIG. 7. In some embodiments, step 804 includes generating and transmitting control signals to switches (e.g., transistors) of a bridge circuit. For example, a DC-DC converter (e.g., DC-DC converter 220 of FIGS. 2-3, or DC-DC converter 420 of FIGS. 4A-4B) may be arranged between a low-voltage DC bus (e.g., low-voltage DC bus 281 of FIG. 3, or low-voltage DC bus 481 of FIGS. 4A-4B) and a high-voltage DC bus (e.g., high-voltage DC bus 282 of FIG. 3, or high-voltage DC bus 482 of FIGS. 4A-4B), and may be configured to transfer power between the two DC buses. A low-voltage battery (e.g., low-voltage battery 210 of FIG. 2, or low-voltage battery 410 of FIGS. 4A-4B), such as a 12V battery used for auxiliary loads (e.g., electric loads 215 of FIG. 2), may be coupled across the low-voltage DC bus (e.g., using one or more contactors). In a further example, a low-voltage capacitor bank may be coupled across the low-voltage DC bus and may be configured to store charge. A high-voltage battery, such as a battery pack used for a drivetrain (e.g., battery 102 of FIG. 1, battery pack 202 of FIGS. 2-3, or battery pack 402 of FIGS. 4A-4B), may be configured to be coupled across the high-voltage DC bus (e.g., using one or more contactors), although the battery pack may be decoupled during step 804 (e.g., high-voltage contactor 222 of FIG. 3, or high-voltage contactor 422 of FIGS. 4A-4B). In a further example, a high-voltage capacitor bank (e.g., high-voltage capacitor bank 223 of FIG. 3, or high-voltage capacitor bank 423 of FIGS. 4A-4B) may be coupled across the high-voltage DC bus and may be configured to store charge. Step 804 may include generating and transmitting control signals (e.g., using charging controller 103 of FIG. 1, control circuitry 280 or OBC 230 of FIGS. 2-3) to the DC-DC converter to transfer energy from the low-voltage DC bus to the high-voltage DC bus, to pre-charge the high-voltage bus. During pre-charging, the voltage across the high-voltage bus may increase. For example, the control circuitry may cause the voltage of the high-voltage DC bus to increase a predetermined ramp rate (e.g., in voltage per second). In some embodiments, for example, step 804 includes closing a contactor to couple the low-voltage battery across the low-voltage DC bus (e.g., if not already coupled), transmitting control signals to the DC-DC converter, monitoring a voltage and/or current of the high-voltage DC bus (e.g., using a voltage or current sensor), achieving a desired voltage of the high-voltage bus (e.g., a nominal voltage, a voltage exceeding a threshold, a setpoint, or any other suitable criteria) by pre-charging the high-voltage capacitor, any other suitable operations, or any combination thereof. Step 804 occurs with the high-voltage contactor open such that a high-voltage battery is not coupled across the high-voltage DC bus (e.g., coupled to only one line of the high-voltage DC bus). For example, because the high-voltage battery may be at a low SOC or otherwise not capable of charging DC buses, the high-voltage contactor remains open to prevent further discharging the high-voltage battery. Step 806 includes achieving a nominal high-voltage bus voltage. For example, step 804 may proceed until the voltage across the high-voltage DC bus reaches a predetermined value.

Step 808 includes pre-charging a mid-bus using a low-voltage battery, and step 810 includes achieving a nominal mid-bus voltage, with the high-voltage contactor open such that a high-voltage battery is not coupled across the high-voltage DC bus. In some embodiments, steps 810 and 808 may be combined, wherein the mid-bus is pre-charged up to a desired voltage. Steps 804 and 806 occur during a first time period, and steps 808 and 810 occur during substantially the same time period (e.g., as part of process 820 directed to pre-charging both the high-voltage DC bus and the mid-bus). Accordingly, the high-voltage DC bus and mid-bus are charged simultaneously by the low-voltage battery, because the high-voltage battery is at a low SOC. In some embodiments, step 808 includes generating and transmitting control signals to switches (e.g., transistors) of a bridge circuit. For example, a DC-DC converter (e.g., OBC DAB 234 of FIG. 3) may be arranged between the high-voltage DC bus (e.g., high-voltage DC bus 282 of FIG. 3) and the mid-bus (e.g., mid-bus 283 of FIG. 3), and may be configured to transfer power between the two DC buses. A mid-bus capacitor bank (e.g., mid-bus capacitor bank 231 of FIG. 3, or mid-bus capacitor bank 431 of FIGS. 4A-4B), may be coupled across the mid-bus. Step 808 may include generating and transmitting the control signals (e.g., using charging controller 103 of FIG. 1, control circuitry 280 or OBC 230 of FIGS. 2-3) to the DC-DC converter to transfer energy from the high-voltage DC bus (e.g., from the high-voltage capacitor bank coupled thereof) to the mid-bus, to pre-charge the mid-bus (e.g., the mid-bus capacitor bank). During pre-charging, the voltage across the mid-bus may increase. In some embodiments, for example, step 808 includes transmitting control signals to the DC-DC converter, monitoring a voltage and/or current of the mid-bus (e.g., using a voltage or current sensor), achieving a desired voltage of the mid-bus (e.g., a nominal voltage, a voltage exceeding a threshold, a setpoint, or any other suitable criteria) by pre-charging the mid-bus capacitor bank, any other suitable operations, or any combination thereof. In some embodiments, the control signals to the DC-DC converter between the high-voltage DC bus and the mid-bus may include predetermined duty cycles. For example, step 808 may include applying open loop control to switches of a bridge circuit of the DC-DC converter. In a further example, step 804 may include applying closed-loop control to the DC-DC converted arranged between the low-voltage DC bus and the high-voltage DC bus (e.g., to cause a predetermined ramp rate in voltage). During the same time, a fixed duty cycle may be applied to switches of a bridge circuit of the DC-DC converter arranged between the high-voltage DC bus and the mid-bus, which need not necessarily cause a fixed ramp rate of the mid-bus voltage. Step 810 includes achieving a nominal mid-bus voltage. During pre-charging at step 808, the voltage across the mid-bus may increase. In some embodiments, step 810 includes monitoring a voltage and/or current of the mid-bus (e.g., using a voltage or current sensor), achieving a desired voltage of the mid-bus (e.g., a nominal voltage, a voltage exceeding a threshold, a setpoint, or any other suitable criteria) by pre-charging the mid-bus capacitor bank, any other suitable operations, or any combination, thereof.

Step 812 includes pre-charging an AC capacitor bank, while the high-voltage contactor (e.g., high-voltage contactor 222 of FIG. 3, or high-voltage contactor 422 of FIGS. 4A-4B) is open such that a high-voltage battery is not coupled across the high-voltage DC bus. Step 812 includes pre-charging an AC capacitor bank (e.g., AC capacitor bank 436 of FIGS. 4A-4B), and step 814 includes locking a voltage of the AC capacitor bank with a voltage of an AC grid (e.g., AC system 150 of FIG. 1, grid 250 of FIG. 3, or grid 450 of FIGS. 4A-4B). In some embodiments, steps 814 and 812 may be combined (e.g., process 821 directed to pre-charging the AC capacitor bank), wherein the AC bus is pre-charged up to a desired voltage or otherwise synchronized with an AC system. In some embodiments, step 812 includes measuring a voltage of the AC system (e.g., AC system 150 of FIG. 1, grid 250 of FIG. 3, or grid 450 of FIGS. 4A-4B) using a suitable voltage sensor (e.g., sensor 470 of FIGS. 4A-4B), and pre-charging the AC capacitor bank coupled across the AC bus (e.g., AC Bus 284 of FIG. 3, or AC bus 484 of FIGS. 4A-4B) to match the voltage of the AC system. In some embodiments, step 812 is performed with a grid contactor (e.g., grid contactor 241 of FIG. 3, or grid contactor 441 of FIGS. 4A-4B) open such that the AC system is disconnected from the AC bus. To illustrate, the AC system may operate at a suitable voltage having a sinusoidal character (e.g., with a frequency of 60 Hz). For example, the AC system may operate at 240 VAC, 120 VAC, or any other suitable voltage, and may include single-phase, or 3-phase operation. As the AC bus is pre-charged, at step 814 the voltage of the AC bus is matched (e.g., synchronized in phase) to the AC system. For example, step 814 may include applying a phase-locked loop controller to lock the phases. In some embodiments, step 814 includes monitoring a phase difference between the AC bus and the AC system over time until step 816 is performed.

Step 816 includes closing a grid contactor (e.g., grid contactor 241 of FIG. 3, or grid contactor 441 of FIGS. 4A-4B). In some embodiments, step 816 includes generating and transmitting a control signal to suitable terminals of the grid contactor to cause the grid contactor to close (i.e., connect the grid to the OBC). Once the grid contactor is closed, the AC system (e.g., AC system 150 of FIG. 1, grid 250 of FIG. 3, or grid 450 of FIGS. 4A-4B) is electrically coupled to the OBC (e.g., OBC 230 of FIGS. 2-3, OBC PFC 235 of FIG. 3, or DC-AC converter 435 of FIGS. 4A-4B), and accordingly may exchange AC power with the OBC.

Step 818 includes closing a high-voltage battery contactor (e.g., high-voltage contactor 222 of FIG. 3, or high-voltage contactor 422 of FIGS. 4A-4B). In some embodiments, step 818 includes generating and transmitting a control signal to suitable terminals of the contactor to cause the contactor to close (i.e., connect the circuits). Once the high-voltage battery contactor is closed, the battery pack is coupled to the high-voltage DC bus, and accordingly may receive DC power from the high-voltage DC bus.

Step 820 includes beginning power flow for charging. In some embodiments, the system is configured for bidirectional charging, but the high-voltage battery does not have sufficient SOC to provide pre-charging or charging. In some such circumstances, step 820 includes generating and transmitting control signals to DC-DC converters (e.g., DC-DC converter 220 and OBC 230 of FIGS. 2-3, and OBC DAB 234 of FIG. 3, or DC-DC Converter 420 and OBC DAB 430 of FIGS. 4A-4B), generating and transmitting control signals to DC-AC converters (e.g., OBC 230 of FIG. 2, OBC PFC 235 of FIG. 3, or DC-AC converter 435 of FIGS. 4A-4B), measuring one or more electrical parameters (e.g., voltage, current, impedance, frequency) using any suitable sensor, monitoring a SOC of a battery, monitoring a state of health of a battery, any other suitable operations, or any combination thereof.

In an illustrative example, panel 850 shows a portion of a system, including high-voltage DC bus 882, DC-DC converter 830 (e.g., similar to OBC DAB 234 of FIG. 3, or OBC DAB 430 of FIGS. 4A-4B), and mid-bus capacitor bank 831 (e.g., similar to mid-bus capacitor bank 231 of FIG. 3, or mid-bus capacitor bank 431 of FIGS. 4A-4B), and mid-bus 883 (e.g., similar to mid-bus 283 of FIG. 3, or mid-bus 483 of FIGS. 4A-4B). As illustrated, DC-DC converter 830 includes first bridge circuit 871 (e.g., including four sets of transistors and diodes, as illustrated) connected to high-voltage DC bus 882, second bridge circuit 872 (e.g., including another four sets of transistors and diodes, as illustrated) connected to mid-bus 883, and transformer 873 (e.g., having any suitable turns ratio) arranged between first and second bridge circuits 871 and 872. DC-DC converter 830 may also include a capacitor on each side, or otherwise exhibit a capacitance on each side (e.g., across each DC bus). It will be understood that DC-DC converter may include any suitable type of circuitry such as, for example, a phase-shifted full-bridge (PSFB) converter, resonant LLC converter), or a dual-active bridge architecture. For example, step 804 may include a first DC-DC converter operating under closed-loop control to pre-charge the high-voltage capacitor bank to a commanded voltage (e.g., per a rate of pre-charge V/s and low-voltage battery current limits). Step 808 may include DC-DC converter 830 operating in open loop with fixed single-phase shift (SPS) duty cycles (e.g., at 50% duty as illustrated by signals 851 and 852, or any other predetermined value) on the high-voltage DC bus side bridge (e.g., bridge circuit 871) and diode rectification operation on the mid-bus side bridge (e.g., bridge circuit 872). In some embodiments, the switches on the mid-bus side are not controlled during pre-charging the mid-bus. Any suitable modulation technique may be applied to pre-charge the mid-bus using DC-DC converter 830. For example, in the context of process 820, the high-voltage DC bus and the mid-bus rise in voltage together (e.g., simultaneously get pre-charged) differing between the two only by the turns ratio of transformer 873 (e.g., the turns ratio difference being specific to some modulation techniques). Process 820 may include pulse-width modulation, pulse-density modulation, or transmitting any other suitable type of control signal.

In an illustrative example, panel 860 shows two plots: the top plot shows voltage trace 861 of the mid-bus voltage over time, and the bottom plot shows current trace 862 corresponding to processes 621 and 721, and current trace 863 corresponding to process 820. Voltage trace 861 may roughly correspond to any of processes 621, 721, or 820, while the current traces exhibit greater differences. For example, when pre-charging occurs sequentially, as in processes 621 and 721, the current draw of the low-voltage battery while charging the high-voltage DC bus is shown by current trace 862. The current draw of the low-voltage battery while charging both the high-voltage DC bus and mid-bus is shown by current trace 863. Current trace 863 exhibits a greater magnitude in peak current draw because of the added capacitance of the mid-bus capacitor bank during process 820. Because process 621 and 721 include using the low-voltage battery to first charge only the high-voltage DC bus, and then the high-voltage contactor is closed, the high-voltage battery and capacitor bank may charge the mid-bus, resulting in a lesser load on the low-voltage battery. Accordingly, process 800 may applied when the high-voltage battery is unavailable for pre-charging, but may incur greater current draw on the low-voltage battery. To illustrate under one set of conditions (e.g., 0.5 ramp time at 900 V/s ramp rate), using the low-voltage battery to pre-charge both the high-voltage DC bus and the mid-bus may increase the low-voltage battery power draw from 1 kW to 1.68 kW over the same time period (e.g., for a given pre-charge ramp rate), due to the increased capacitance.

In an illustrative example, process 800 includes causing a first DC bus to be pre-charged at step 804 and causing a second bus to be pre-charged at step 808 occur simultaneously during a time period, while a first contactor arranged between the first DC bus and the high-voltage battery is open during the time period (e.g., before the contactor is closed at step 818). For example, step 804 may include causing the first DC bus to be pre-charged by applying feedback control (e.g., controlling low-voltage battery current draw and/or high-voltage DC bus voltage), and step 808 may include causing the second DC bus to be pre-charged by applying open loop control based on a predetermined control signal (e.g., fixed duty cycles to the high-voltage side of a DAB). To illustrate, the control signal may be a first control signal, a first capacitor may be coupled across the high-voltage DC bus, a first DC-DC converter is coupled between the low-voltage DC bus and the high-voltage DC bus. Further, process 800 may include determining a SOC of the first battery (a high-voltage battery) is less than a threshold at step 803, and before closing the contactor at step 818, and transmitting a second control signal to a second DC-DC converter to charge a second capacitor coupled to an intermediate DC bus. The second DC-DC converter is configured to transfer power between the high-voltage DC bus and the intermediate DC bus. The second DC bus, which may be a mid-bus, may be coupled to a DC-AC converter coupled to an AC bus, and a second contactor is configured to couple and decouple the AC bus from the grid. Process 800 may include transmitting a third control signal to the DC-AC converter to pre-charge the AC bus at step 812, and causing the second contactor to be closed at step 816.

Figure 9:
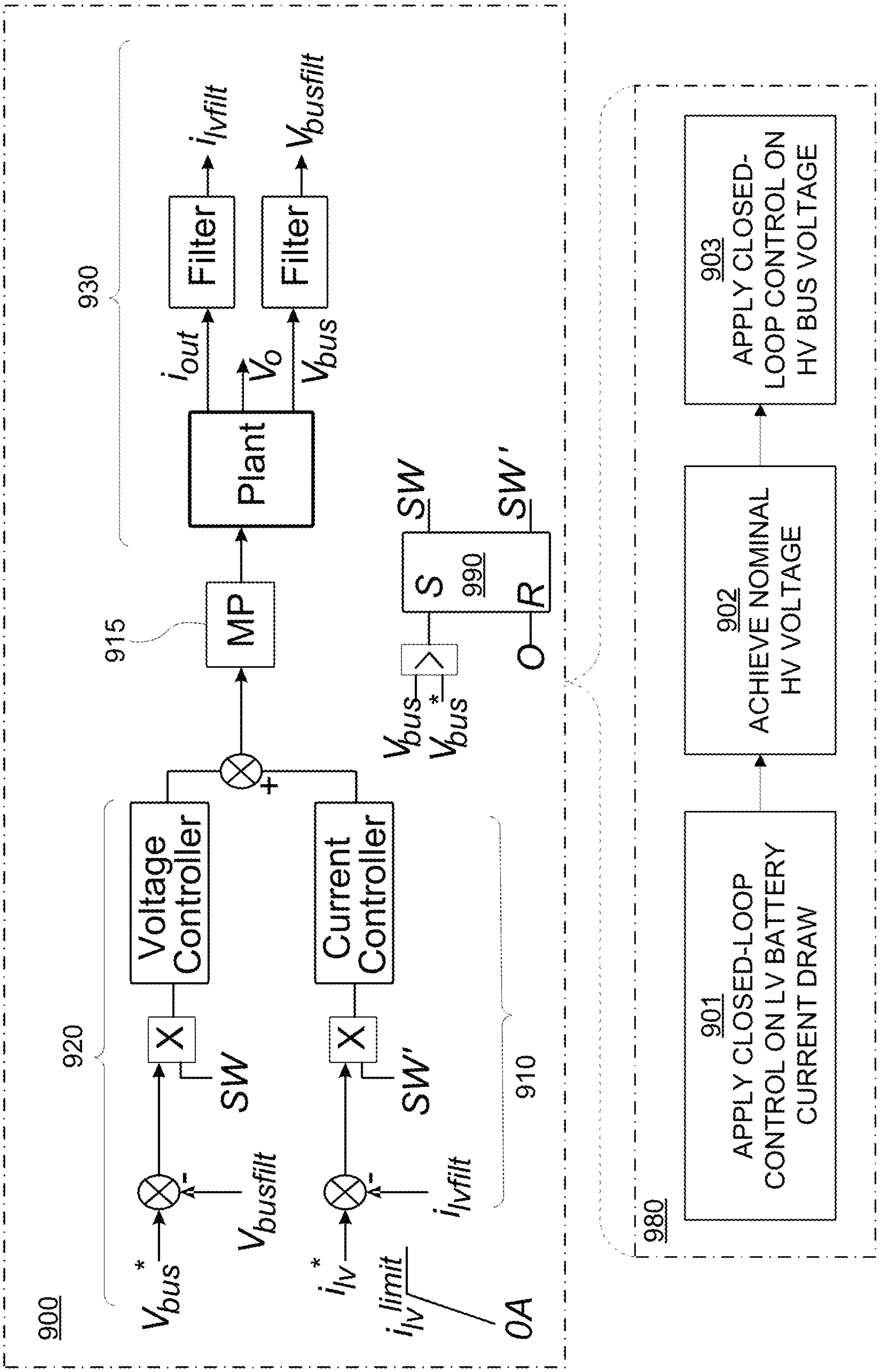
FIG. 9 is a flowchart of an illustrative controller for controlling high-voltage DC bus pre-charging, in accordance with some embodiments of the present disclosure.

FIG. 9 is a flowchart of illustrative controller 900 for controlling high-voltage DC bus pre-charging (e.g., process 980), in accordance with some embodiments of the present disclosure. Controller 900 may be implemented using control circuitry (charging controller 103 of FIG. 1, control circuitry 280 or OBC 230 of FIGS. 2-3), to cause the low-voltage battery current draw to ramp from zero at a predetermined rate (e.g., Amps/s). In some embodiments, the maximum limit of the current ramp command may be based on the low-voltage battery SOC (e.g., starting or instantaneous SOC). In some embodiments, the maximum limit of the current ramp need not be based on the low-voltage battery SOC because, for example, the system monitors for brown-out conditions and may modify the ramp accordingly. For example, controller 900 may apply current control for the low-voltage battery to the DC-DC converter at step 901, which continues until the high-voltage DC bus reaches a target value at step 902 (e.g., a predetermined nominal voltage). This approach may correspond to indirect control of the voltage ramp up of the high-voltage DC bus (e.g., the low-voltage battery current is controlled instead), delays in the high-voltage DC bus voltage drop due to delays in switching across the DC-DC converter transformer may be lessened. For example, the low-voltage battery current draw may respond faster to the dead zone (e.g., when real power flow is not affected despite control signal changes due to a dead-time of the complementary switching devices in the converter bridge) than attempting to control the high-voltage DC bus voltage directly (e.g., also because of the relatively large capacitance of the high-voltage capacitor bank). Once the high-voltage DC bus reaches the target voltage, controller 900 switches to high-voltage DC bus voltage control at step 903 (e.g., feedback control) with the $\phi$ from the current loop as a feedforward to the voltage control loop. The central axis phase-shift $\phi$ is between voltages on each side of the transformer in the DC-DC converter (e.g., DC-DC converter 420 of FIGS. 4A-4B) between the high and low voltage DC buses. During pre-charging, as power increases, a dead-zone may occur, where increases in § do not correspond to an increase in power. Such dead-zones may introduce lag into the controller. In some embodiments, controlling the low-voltage battery current draw may lessen this lag, provide more stable control, and/or provide faster response to control signals. For example, if high-voltage DC bus voltage were controlled during pre-charge, the controller may need to wait until the high-voltage DC bus voltage drops to resume control. A dead-zone may arise because of the dead-time, when gate pulses (e.g., driving signals) to complementary switching devices of the converter bridge are both in an off state. To illustrate, dead-time may prevent both switching devices (e.g., FETs) from being turned on at the same time and may cause a short of the DC link. In steady state, where the high-voltage DC bus voltage is maintained, a relatively slow voltage control loop may be used. For example, illustrative flip-flop element 990 provides the logic for transitioning from low-voltage battery current control to high-voltage DC bus voltage control, latching once the measured voltage of the high-voltage DC bus exceeds the target value (e.g., reaches the nominal voltage).

In an illustrative example, controller 900 may be configured to generate and transmit a control signal to a DC-DC converter coupled between a low-voltage DC bus and a high-voltage DC bus. The control signal may correspond to a predetermined ramp rate of current draw (operation 910) from the low-voltage battery to pre-charge the high-voltage capacitor up to a predetermined voltage. The ramp rate of the current draw of the low-voltage battery may cause the high-voltage capacitor to be pre-charged up to a predetermined voltage (e.g., although the ramp rate in voltage might not be strictly linear due to losses). In some embodiments, the DC-DC converter (e.g., DC-DC converter 220 of FIGS. 2-3, or DC-DC converter 420 of FIGS. 4A-4B) includes a bridge circuit, and controller 900 may generate a control signal that causes duty cycles of the bridge circuit to increase at a predetermined ramp rate from zero duty cycle up to half of a full duty cycle. For example, the control signal may correspond to a ramp rate of current draw from the low-voltage battery. In a further example, the control signal may cause the current draw of the low-voltage battery to increase up to a maximum current value, where the maximum current value corresponds to a predetermined drop in voltage of the DC low-voltage bus (e.g., a brown-out limit). In some embodiments, the control signal is a first control signal, and controller 900 may be configured to measure a voltage across the low-voltage DC bus, determine that the voltage is below a predetermined threshold (e.g., the brown-out limit), and transmit a second control signal to the DC-DC converter to cause the voltage across the low-voltage DC bus to be maintained at the threshold (e.g., as illustrated in region 663 of panel 660 of FIG. 6). In some embodiments, where the control signal is a first control signal, and controller 900 may be configured to measure a voltage across the high-voltage DC bus, determine that the voltage has reached a predetermined nominal voltage, and transmit a second control signal to the DC-DC converter (operation 920) to cause the voltage across the high-voltage DC bus to be maintained at the predetermined nominal voltage (e.g., region 664 of panel 660 of FIG. 6). As illustrated, controller 900 includes a processor 915 having a computational delay, and plant 930 as a stand-in for the DC-DC converter and measurements for feedback.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:

transferring power, using a DC-DC converter, from a low-voltage DC bus to a high-voltage DC bus while a high-voltage battery is not coupled across the high-voltage DC bus to pre-charge a capacitor connected across the high-voltage DC bus, wherein;

the low-voltage DC bus is connected to a low-voltage battery; and the DC-DC converter is configured to transfer the power based on a ramp rate of current draw from the low-voltage battery; and causing a contactor, arranged between the high-voltage DC bus and the high-voltage battery, to close to connect the high-voltage battery across the high-voltage DC bus after pre-charging the capacitor.

2. The method of claim 1, wherein:

the ramp rate is a predetermined ramp rate;

the DC-DC converter is configured to transfer power based on the predetermined ramp rate to pre-charge the capacitor up to a predetermined voltage; and the predetermined ramp rate causes the capacitor to be pre-charged up to the predetermined voltage.

3. The method of claim 1, wherein:

the ramp rate is a predetermined ramp rate;

the DC-DC converter comprises a bridge circuit; and the DC-DC converter is configured to transfer power by increasing a duty cycle of the bridge circuit at the predetermined ramp rate from a zero duty cycle up to half of a full duty cycle.

4. The method of claim 1, wherein:

the DC-DC converter is configured to transfer power based on a control signal; and the control signal corresponds to the ramp rate.

5. The method of claim 1, further comprising:

measuring a voltage across the low-voltage DC bus;

determining that the voltage is below a predetermined threshold; and causing the DC-DC converter to modify the transfer of power to maintain the voltage across the low-voltage DC bus.

6. The method of claim 1, further comprising:

measuring a voltage across the high-voltage DC bus;

determining that the voltage has reached a predetermined nominal voltage; and causing the DC-DC converter to maintain the voltage across the high-voltage DC bus at the predetermined nominal voltage.

7. The method of claim 1, wherein:

the capacitor is a first capacitor;

the DC-DC converter is a first DC-DC converter;

a second DC-DC converter is coupled between the high-voltage DC bus and an intermediate DC bus;

the intermediate DC bus is coupled to a DC-AC converter;

the DC-AC converter is coupled to an AC bus and a grid contactor; and the method further comprises, after closing the contactor:

pre-charging, using the second DC-DC converter, a second capacitor coupled across the intermediate DC bus; and pre-charging, using the DC-AC converter, a third capacitor coupled across the AC bus while the grid contactor is open.

8. The method of claim 1, wherein:

the capacitor is a first capacitor;

the DC-DC converter is a first DC-DC converter; and the method further comprises:

determining that a state of charge (SOC) of the high-voltage battery is less than a predetermined SOC; and before closing the contactor, causing a second DC-DC converter to pre-charge a second capacitor coupled across an intermediate DC bus, wherein the second DC-DC converter is configured to transfer power between the high-voltage DC bus and the intermediate DC bus.

9. The method of claim 1, wherein:

the high-voltage battery comprises a first nominal voltage greater than 100 V and is configured to provide electric power to a drivetrain; and the low-voltage battery comprises a second nominal voltage less than 15.5 V and is configured to provide power to electric loads other than the drivetrain.

10. A method comprising:

receiving an indication to pre-charge a high-voltage DC bus;

transferring power, using a DC-DC converter, from a low-voltage DC bus to the high-voltage DC bus while a high-voltage battery is not coupled across the high-voltage DC bus to pre-charge a capacitor connected across the high-voltage DC bus, wherein:

the low-voltage DC bus is connected to a low-voltage battery;

the DC-DC converter is configured to transfer power based on a control signal;

the control signal causes a current draw of the low-voltage battery to increase up to a maximum current value; and the maximum current value corresponds to a predetermined drop in voltage of the low-voltage DC bus; and causing a contactor, arranged between the high-voltage DC bus and the high-voltage battery, to close to connect the high-voltage battery across the high-voltage DC bus after pre-charging the capacitor.

11. A method comprising:

causing a first DC bus, while a high-voltage battery is decoupled from the first DC bus, to be pre-charged by a low-voltage battery using a first DC-DC converter coupled between the first DC bus and the low-voltage battery;

causing a second DC bus to be pre-charged using a second DC-DC converter coupled between the first DC bus and the second DC bus; and causing an AC bus to be pre-charged, while an AC contactor coupled between the AC bus and an AC system is open, using a DC-AC converter coupled to the second DC bus and to the AC bus.

12. The method of claim 11, wherein a first contactor is configured to couple and decouple the high-voltage battery across the first DC bus, the method further comprising:

closing the first contactor after causing the first DC bus, the second DC bus, and the AC bus to be pre-charged.

13. The method of claim 11, wherein:

causing the first DC bus to be pre-charged and causing the second DC bus to be pre-charged occur simultaneously during a time period; and a first contactor arranged between the first DC bus and the high-voltage battery is open during the time period.

14. The method of claim 13, wherein:

causing the first DC bus to be pre-charged comprises applying feedback control; and causing the second DC bus to be pre-charged comprises applying open loop control based on a predetermined control signal.

15. The method of claim 11, further comprising:

receiving a sensor signal from a voltage sensor coupled to the AC system, wherein causing the AC bus to be pre-charged comprises matching a first voltage of the AC bus to a second voltage of the AC system based on the sensor signal; and causing the AC contactor to be closed after matching the first voltage to the second voltage.

16. A system comprising:

a high-voltage battery;

a DC-DC converter connected between a low-voltage DC bus and a high-voltage DC bus;

a low-voltage battery configured to be connected and disconnected from the low-voltage DC bus;

a capacitor connected across the high-voltage DC bus;

a contactor configured to connect and disconnect the high-voltage battery from the high-voltage DC bus; and control circuitry configured to:

receive an indication to pre-charge the high-voltage DC bus;

cause the DC-DC converter to transfer power from the low-voltage DC bus to the high-voltage DC bus while the high-voltage battery is disconnected from the high-voltage DC bus to pre-charge the capacitor in response to the indication; and close the contactor to connect the high-voltage battery across the high-voltage DC bus after the capacitor has been pre-charged.

17. The system of claim 16, wherein:

the capacitor is a first capacitor;

the DC-DC converter is a first DC-DC converter; and the control circuitry is further configured to, after closing the contactor:

cause a second DC-DC converter to pre-charge a second capacitor coupled to an intermediate DC bus, wherein the second DC-DC converter is configured to transfer power between the high-voltage DC bus and the intermediate DC bus.

18. The system of claim 17, wherein:

the intermediate DC bus is coupled to an AC-DC converter, and wherein the AC-DC converter is coupled to an AC bus and a grid contactor; and the control circuitry is further configured to:

cause the AC-DC converter to match a first voltage of the AC bus to a second voltage of a grid coupled to the grid contactor; and cause the grid contactor to be closed after matching the first voltage to the second voltage.

19. The system of claim 16, wherein:

the capacitor is a first capacitor;

the DC-DC converter is a first DC-DC converter; and wherein the control circuitry is further configured to:

determine that a state of charge of the high-voltage battery is less than a threshold; and before closing the contactor, cause a second DC-DC converter to pre-charge a second capacitor coupled to an intermediate DC bus, wherein the second DC-DC converter is configured to transfer power between the high-voltage DC bus and the intermediate DC bus.

20. The system of claim 19, wherein:

the intermediate DC bus is coupled to a DC-AC converter coupled to an AC bus;

a second contactor is configured to couple and decouple the AC bus from a grid; and the control circuitry is further configured to:

cause the DC-AC converter to pre-charge the AC bus; and cause the second contactor to be closed.

* * * * *